(12) United States Patent
Chauvin et al.

(10) Patent No.: US 11,773,763 B2
(45) Date of Patent: Oct. 3, 2023

(54) DOSING AND MIXING ASSEMBLIES FOR EXHAUST AFTERTREATMENT SYSTEM

(71) Applicant: Donaldson Company, Inc., Bloomington, MN (US)

(72) Inventors: Corine Chauvin, Caen (FR); Korneel De Rudder, Winksele (BE); Anil C. Agar, Leuven (BE); Bart Schellens, Overijse (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 17/642,620

(22) PCT Filed: Jun. 30, 2020

(86) PCT No.: PCT/US2020/040293
§ 371 (c)(1),
(2) Date: Mar. 11, 2022

(87) PCT Pub. No.: WO2021/050157
PCT Pub. Date: Mar. 18, 2021

(65) Prior Publication Data
US 2022/0341357 A1   Oct. 27, 2022

Related U.S. Application Data

(60) Provisional application No. 62/971,344, filed on Feb. 7, 2020.

(30) Foreign Application Priority Data

Sep. 13, 2019 (EP) ..................................... 19197416

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01);
(Continued)

(58) Field of Classification Search
CPC .. F01N 3/2066; F01N 3/2892; F01N 2240/20; F01N 2470/02; F01N 2470/04;
(Continued)

(56) References Cited

U.S. PATENT DOCUMENTS 8,079,211 B2   12/2011   Levin et al.
8,302,391 B2   11/2012   Wirth et al.
(Continued)

FOREIGN PATENT DOCUMENTS

CN   108397262 A1   8/2018
DE   102012010878 A1   12/2013
(Continued)

OTHER PUBLICATIONS

International Search Report and Written Opinion for PCT/US2020/040293, dated Oct. 13, 2019.
(Continued)

*Primary Examiner* — Audrey B. Walter
(74) *Attorney, Agent, or Firm* — Merchant & Gould P.C.

(57) ABSTRACT

A dosing and mixing assembly for an exhaust aftertreatment device includes a conduit arrangement defining overlapping, coaxial flow paths that join at a common flow path. The conduit arrangement defines a mixing region upstream of the overlapping, coaxial flow paths, an impact region at the overlapping, coaxial flow paths, and a merge region where the coaxial flow paths join. The outer of the coaxial flow paths insulates the inner of the flow paths at least as the impact region. Reactant can be dispensed into the inner flow path along a spray path that intersects the impact region of the conduit arrangement. A spray protector can be provided
(Continued)

at or upstream of the mixer to inhibit swirling of reactant at the doser nozzle.

20 Claims, 25 Drawing Sheets

(52) U.S. Cl.
CPC ...... *F01N 2470/02* (2013.01); *F01N 2470/04* (2013.01); *F01N 2470/08* (2013.01); *F01N 2470/24* (2013.01); *F01N 2610/02* (2013.01); *F01N 2610/1453* (2013.01)

(58) Field of Classification Search
CPC ............. F01N 2470/08; F01N 2470/24; F01N 2610/02; F01N 2610/1453
See application file for complete search history.

(56) References Cited

U.S. PATENT DOCUMENTS

| | | | |
|---|---|---|---|
| 8,454,897 | B2 | 6/2013 | Wirth et al. |
| 8,495,866 | B2 | 7/2013 | Wirth |
| 8,511,076 | B2 | 8/2013 | Wirth |
| 8,596,044 | B2 | 12/2013 | Werni et al. |
| 8,800,276 | B2 | 8/2014 | Levin et al. |
| 9,243,544 | B2 | 1/2016 | Tobben et al. |
| 9,266,075 | B2 | 2/2016 | Chapman et al. |
| 9,289,724 | B2 | 3/2016 | Stanavich et al. |
| 9,364,790 | B2 | 6/2016 | Sampath et al. |
| 9,410,460 | B2 | 8/2016 | Hackländer |
| 9,410,464 | B2 | 8/2016 | Hicks et al. |
| 9,464,552 | B2 | 10/2016 | Calvo |
| 9,528,415 | B2 | 12/2016 | Brandl et al. |
| 9,644,516 | B1 | 5/2017 | Chiruta et al. |
| 9,670,811 | B2 | 6/2017 | De Rudder et al. |
| 9,714,598 | B2 | 7/2017 | Alano et al. |
| 9,765,679 | B2 | 9/2017 | Palinkas et al. |
| 9,784,163 | B2 | 10/2017 | Noren, IV et al. |
| 9,790,833 | B2 | 10/2017 | Kobe et al. |
| 9,810,119 | B2 | 11/2017 | Gschwind |
| 9,810,123 | B2 | 11/2017 | Kauderer et al. |
| 9,995,193 | B2 | 6/2018 | Alano et al. |
| 2009/0255242 | A1 | 10/2009 | Peterson et al. |
| 2009/0313979 | A1 | 12/2009 | Kowada |
| 2011/0061369 | A1 | 3/2011 | Yetkin et al. |
| 2012/0322012 | A1* | 12/2012 | Tsumagari ............ F01N 3/0256 431/159 |
| 2013/0167516 | A1 | 7/2013 | Loman |
| 2015/0110681 | A1 | 4/2015 | Ferront et al. |
| 2015/0218996 | A1* | 8/2015 | Brandl ................. F01N 3/2066 60/295 |
| 2016/0017785 | A1 | 1/2016 | Resch et al. |
| 2016/0138454 | A1 | 5/2016 | Alano et al. |
| 2016/0186640 | A1 | 6/2016 | Calvo et al. |
| 2016/0326931 | A1 | 11/2016 | Freeman et al. |
| 2016/0361694 | A1 | 12/2016 | Brandl et al. |
| 2016/0377033 | A1 | 12/2016 | Ferront et al. |
| 2017/0082007 | A1 | 3/2017 | Alano et al. |
| 2017/0114693 | A1 | 4/2017 | Stelzer et al. |
| 2017/0260888 | A1 | 9/2017 | Solipuram et al. |
| 2017/0282135 | A1 | 10/2017 | Whitten et al. |
| 2017/0321592 | A1 | 11/2017 | Owen et al. |
| 2018/0112571 | A1* | 4/2018 | Oohara ................. F01N 3/2066 |

FOREIGN PATENT DOCUMENTS

| | | |
|---|---|---|
| DE | 102016117900 A1 | 3/2017 |
| DE | 102017100246 A1 | 5/2018 |
| EP | 2128398 A1 | 12/2009 |
| EP | 2865861 A1 | 4/2015 |
| EP | 3216992 A1 | 9/2017 |
| EP | 3392480 A1 | 10/2018 |
| GB | 2452249 A | 3/2009 |
| WO | 2011/163395 A1 | 12/2011 |
| WO | 2012/013562 A1 | 2/2012 |
| WO | 2012/089290 A1 | 7/2012 |
| WO | 2018/156146 A1 | 8/2018 |
| WO | 2021/003291 A1 | 1/2021 |

OTHER PUBLICATIONS

S. Jensen, "Technologies Come Together for Emissions Reduction", OEM Off-Highway (May 2, 2017).
"Proventia SuperTornado urea mixing technology", The Wayback Machine (Mar. 19, 2019).
International Search Report and Written Opinion for PCT/US2020/040264, dated Aug. 21, 2020.

* cited by examiner

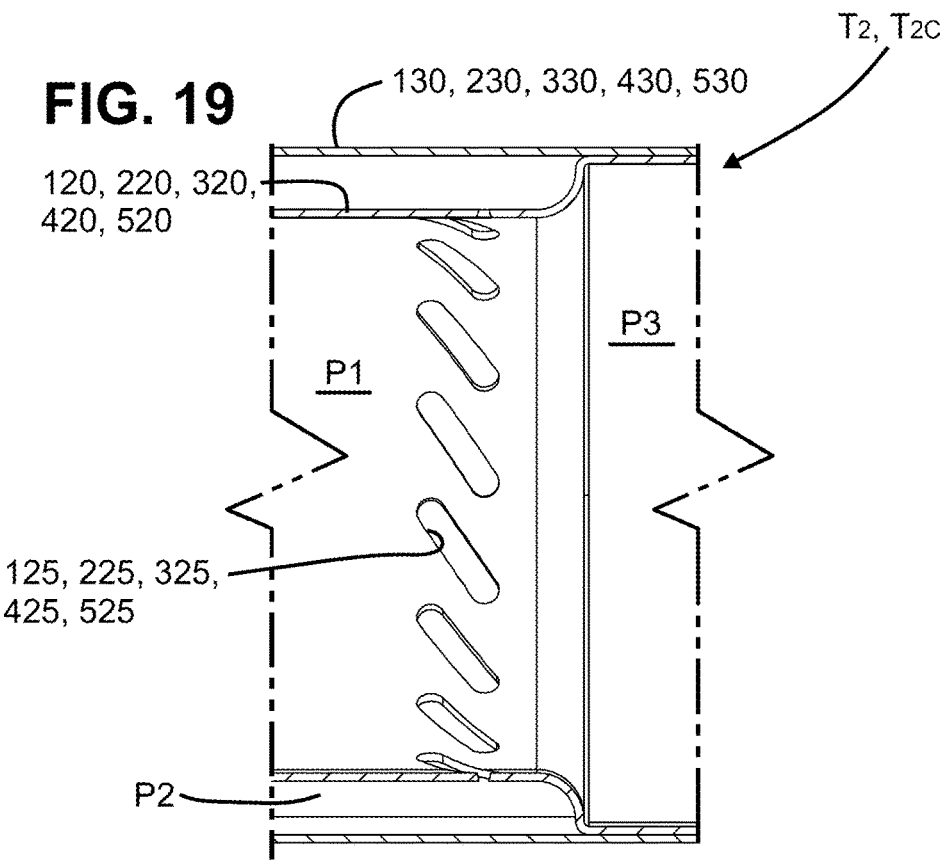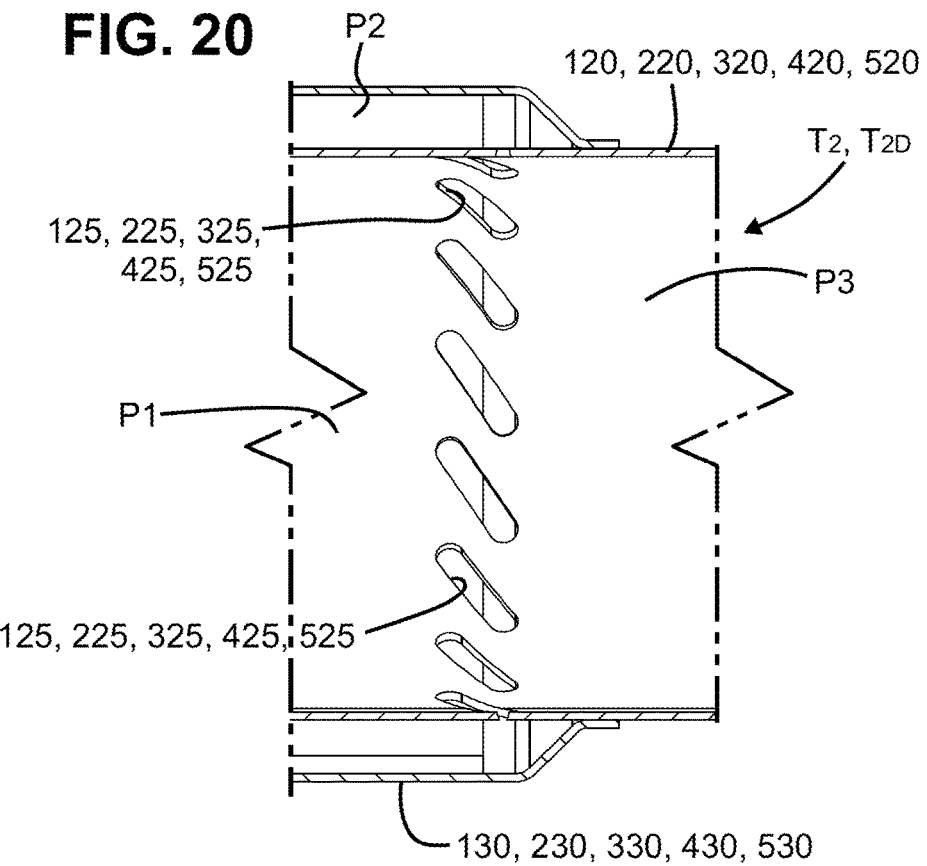

DOSING AND MIXING ASSEMBLIES FOR EXHAUST AFTERTREATMENT SYSTEM

This application is a US National Stage application of PCT International Patent application No. PCT/US2020/040293, filed Jun. 30, 2020, which claims the benefit of priority to European patent application No. 19197416.1, filed Sep. 13, 2019, and U.S. Provisional patent application Ser. No. 62/971,344, filed Feb. 7, 2020, which applications are incorporated herein by reference. To the extent appropriate, a claim of priority is made to each of the above disclosed applications.

BACKGROUND

Vehicles equipped with diesel engines typically include exhaust systems that have aftertreatment systems such as selective catalytic reduction catalyst devices, lean NOx catalyst devices, or lean NOx trap devices to reduce the amount of undesirable gases, such as nitrogen oxides (NOx) from the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. The efficiency of the aftertreatment system depends at least partially upon how evenly the reactants are mixed with the exhaust gases.

A problem with such catalyst device based systems is that reactant (e.g., urea) and reactant-by-product (e.g., cyanuric acid, biuret, melamine, ammelide, and ammeline) deposits can be formed within the exhaust system when decomposition of the injected reactant is incomplete. First, the deposited reactant does not mix with the exhaust, thereby lowering the efficiency of the system. Second, the deposit buildup may eventually clog the system, inhibiting or preventing exhaust flow from reaching the catalyst device.

Improvements are desired.

SUMMARY

Certain aspects of the disclosure are directed to a system and method for treating exhaust gas using an aftertreatment device including a conduit arrangement defining overlapping outer and inner flow paths that join at a common flow path. The conduit arrangement defines a mixing region upstream of the outer flow path, a merge region where the outer and inner flow paths join, and an impact region defined by the inner flow path between the mixing region and the merge region. The outer flow path insulates the inner flow path at least at the impact region. Reactant can be dispensed into the inner flow path.

In certain implementations, the inner flow path is defined by an inner conduit (e.g., a tubular pipe) and the outer flow path is defined between the inner conduit and an outer conduit (e.g., another tubular pipe).

In some implementations, the common flow path is defined by the outer conduit. In other implementations, the common flow path is defined by the inner conduit. In still other implementations, the common flow path is defined by a third conduit that couples to the outer or inner conduit.

In certain examples, reactant is dispensed into the inner flow path along a spray path that intersects the inner conduit at the impact region.

In certain implementations, a mixer is carried by the inner conduit. In certain examples, the mixer includes a swirl mixer. In certain examples, the mixer includes a series of louvered openings defined by the inner conduit. In other examples, other types of flow guides may induce swirl or other mixing turbulence within exhaust passing through the flow guides.

In some implementations, the outer and inner flow paths join when the outer conduit extends beyond the inner conduit. In other implementations, the inner conduit defines one or more apertures that connect the outer and inner flow paths.

In accordance with other aspects of the disclosure, a method of treating exhaust includes guiding a first portion of the exhaust through an entrance to a first flow path of a conduit arrangement; inducing swirling of the first portion of the exhaust at a mixing zone of the first flow path; injecting reactant into the first portion of the exhaust traveling along a conduit that defines at least an impact zone of the first flow path; guiding a second portion of the exhaust to bypass the entrance to the first flow path and to instead enter a second flow path upstream of the entrance to the first flow path; and merging the first and second portions of the exhaust downstream of the impact zone. In certain examples, the second flow path surrounding the conduit at least at the impact zone of the conduit. In certain examples, the impact zone being downstream from the mixing zone, the reactant being injected along a spray path that intersects the conduit at the impact zone.

In certain implementations, merging the first and second portions of the exhaust includes guiding the second portion of the exhaust from the second flow path inwardly through a plurality of apertures defined by the conduit. In certain examples, the apertures are elongate along slot axes. The apertures are oriented so that the slot axes are transverse to flow axes of the merged first and second portions of the exhaust along an interior surface of the conduit. Accordingly, a liquid film of reactant deposited on an inner surface of the conduit defining the apertures will be propelled by the exhaust towards the elongate sides of the apertures. In certain examples, the apertures overlap each other along reference axes normal to the slot axes. Accordingly, any deposited reactant will encounter the elongate side of one of the apertures.

In accordance with certain aspects of the disclosure, a spray path protection zone can be disposed at the doser nozzle to inhibit swirling flow from prematurely widening the spray path of the reactant. In some implementations, the spray path protection zone is defined by a perforated region of the first conduit upstream of the mixer. In other implementations, the spray path protection zone is defined by a perforated conduit disposed within the first conduit. In still other implementations, the spray path protection zone is defined by a louvered section upstream of the mixer that swirls the exhaust in an opposite direction from the mixer.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 17-20 are longitudinal cross-sectional views showing example second transition regions between the impact zone and the merge zone suitable for use with the conduit arrangement shown in FIG. 13;

DETAILED DESCRIPTION

Figure 1:
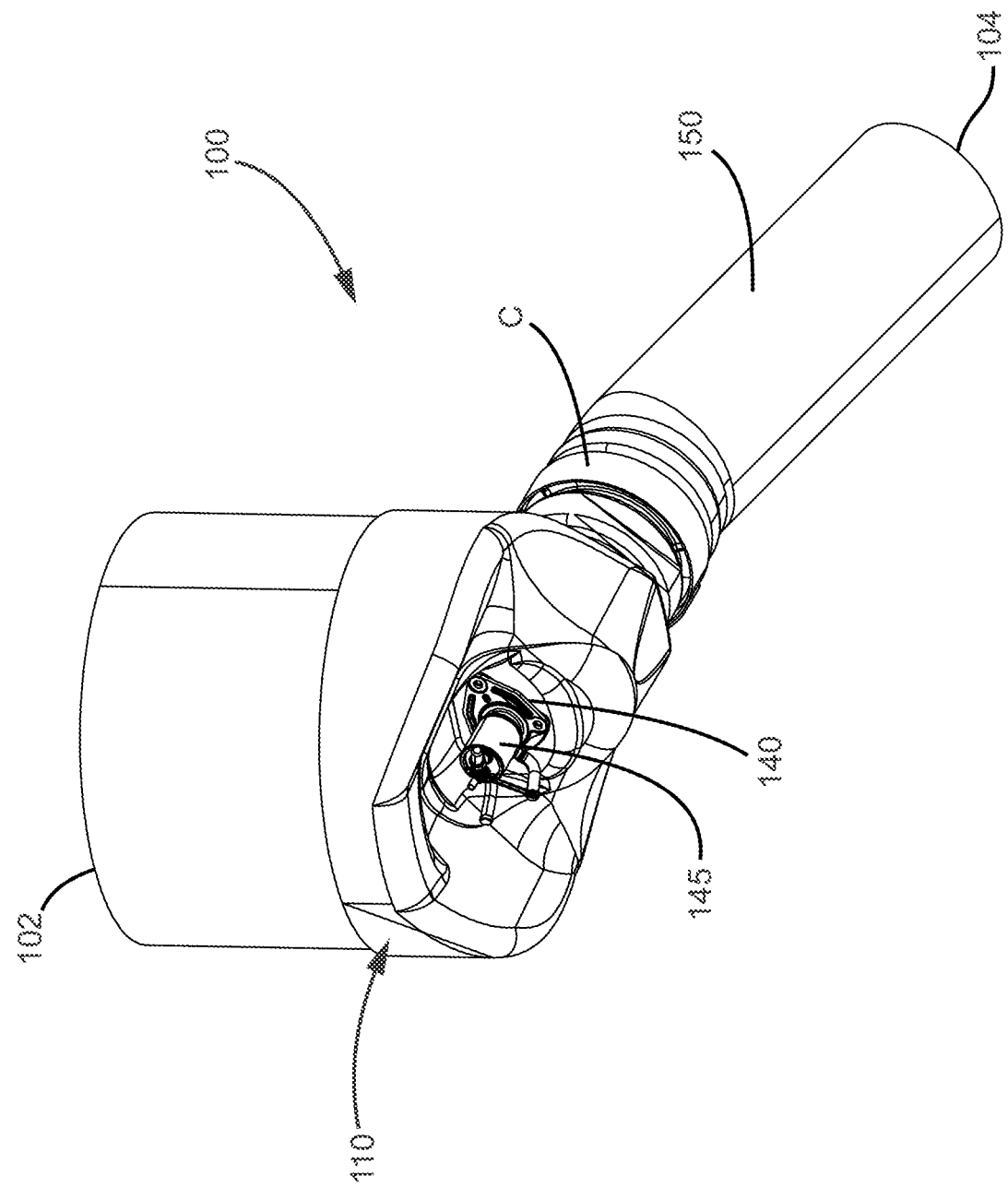
FIG. 1 is a perspective view of a first example dosing and mixing assembly including a conduit arrangement defining a mixing zone, an impact zone, and a merge zone in accordance with the principles of the present disclosure.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a dosing and mixing assembly 100, 200, 300, 400, 500 at which reactant is mixed with exhaust flow within an exhaust aftertreatment device. For convenience within this disclosure, reference numbers in the 100's refer to components of the dosing and mixing assembly 100; reference numbers in the 200's refer to components of the dosing and mixing assembly 200; reference numbers in the 300's refer to components of the dosing and mixing assembly 300; reference numbers in the 400's refer to components of the dosing and mixing assembly 400; and reference numbers in the 500's refer to components of the dosing and mixing assembly 500.

The dosing and mixing assembly 100, 200, 300, 400, 500 includes a conduit arrangement 110, 210, 310, 410, 510 extending along a conduit axis L between an inlet 102, 202, 302, 402, 502 and an outlet 104, 204, 304, 404, 504. Exhaust enters the dosing and mixing assembly 100, 200, 300, 400, 500 at the inlet 102, 202, 302, 402, 502, flows through the conduit arrangement 110, 210, 310, 410, 510 along the conduit axis L, and out through the outlet 104, 204, 304, 404, 504.

The dosing and mixing assembly 100, 200, 300, 400, 500 includes a doser mounting location at which a doser 145, 245, 345, 445, 545 can be secured to the dosing and mixing assembly 100, 200, 300, 400, 500. The doser 145, 245, 345, 445, 545 (also referred to as reactant injector) is configured to inject reactant (e.g., urea) into the exhaust flowing through the conduit arrangement 110, 210, 310, 410, 510. One or more catalytic substrates, such as a selective catalytic reduction (SCR) substrate or an SCR on filter (SCRoF), is disposed downstream of the mixing assembly 110, 210, 310, 410, 510. In certain implementations, the catalytic substrate is coupled to the outlet 104, 204, 304, 404, 504. In other implementations, the catalytic substrate may be disposed within the dosing and mixing assembly 100, 200, 300, 400, 500.

Figure 2:
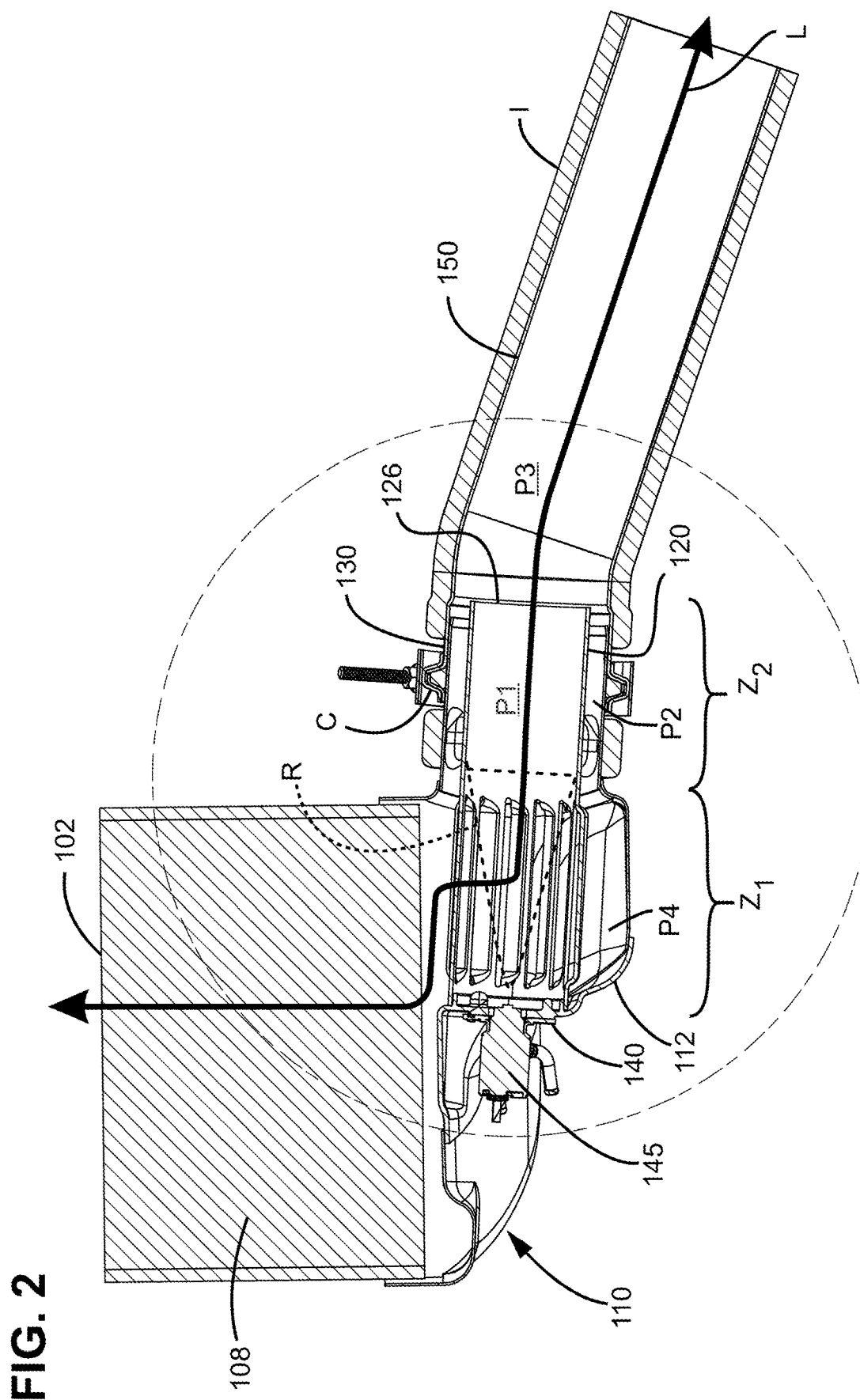
FIG. 2 is a longitudinal cross-sectional view of the dosing and mixing assembly of FIG. 1.
Figure 3:
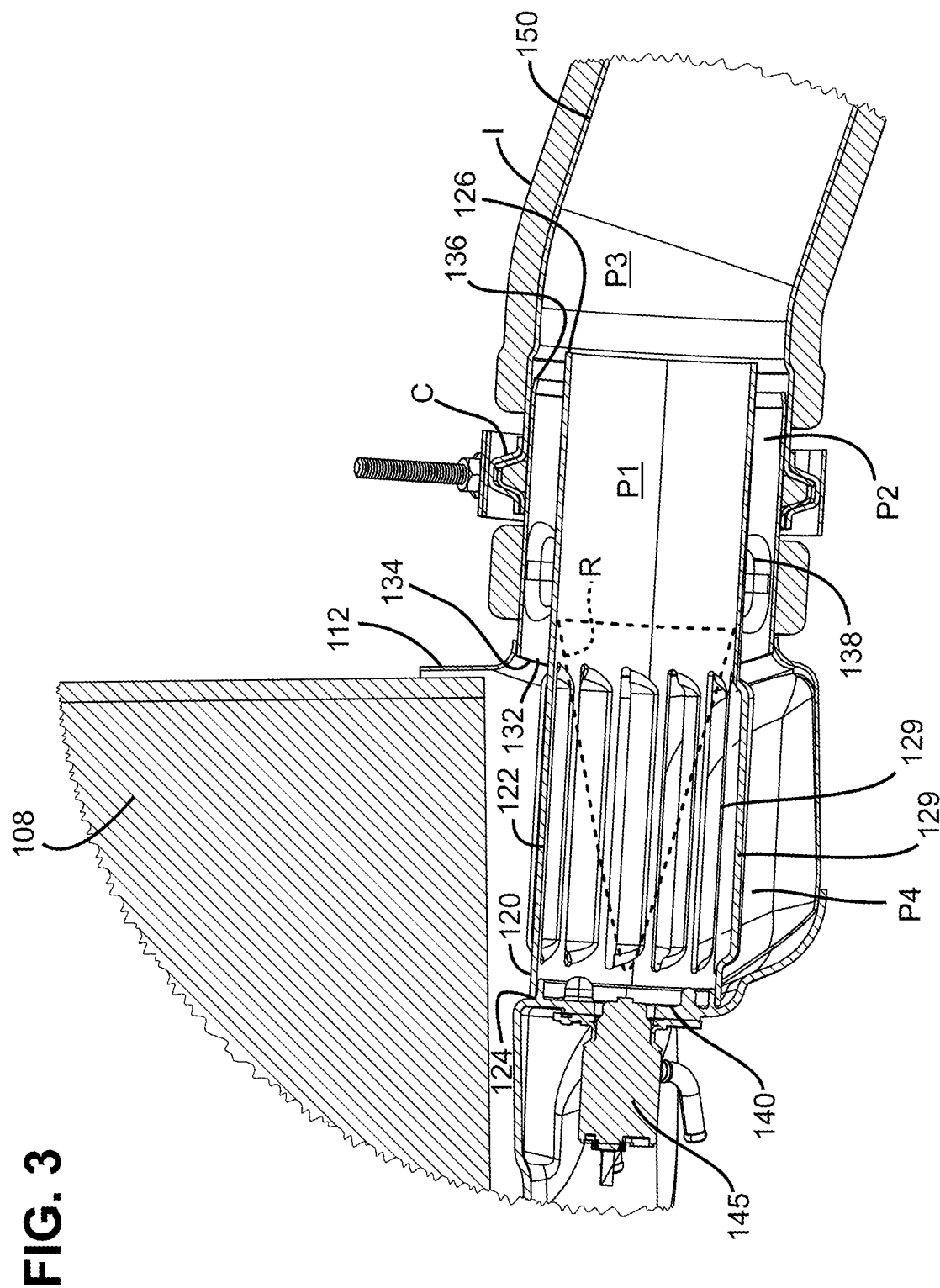
FIG. 3 is an enlarged view of a portion of the dosing and mixing assembly of FIG. 2.

In certain implementations, another treatment substrate 108, 308, 408, 508 may be disposed upstream of the conduit arrangement 110, 210, 310, 410, 510 (see FIG. 2). In various implementations, the upstream treatment substrate 108, 308, 408, 508 can be a diesel particulate filter (DPF), a diesel oxidation catalyst (DOC), a close coupled SCR, or Lean NOx Trap. In certain implementations, both a DPF and a DOC are disposed upstream of the dosing conduit arrangement 110, 210, 310, 410, 510. For example, the output of the one or more upstream substrates 108, 308, 408, 508 may be coupled to the inlet 102, 202, 302, 402, 502 of the conduit arrangement 110, 210, 310, 410, 510.

The conduit arrangement 110, 210, 310, 410, 510 defines a first flow path P1 extending along the conduit axis L of the conduit arrangement 110, 210, 310, 410, 510, a second flow path P2, and a common flow path P3 fed from both the first flow path P1 and the second flow path P2. The second flow path P2 surrounds the first flow path P1. Accordingly, the first flow path P1 may also be referred to herein as the inner flow path and the second flow path P2 may also be referred to herein as the outer flow path. The first flow path P1 has a first entrance 122, 222, 322, 422, 522 at or downstream from the inlet 102, 202, 302, 402, 502. The second flow path P2 has a second entrance 132, 232, 332, 432, 532 that is offset downstream from the first entrance 122, 222, 322, 422, 522. The common flow path P3 leads to the outlet 104, 204, 304, 404, 504.

A first portion of the exhaust passing through the inlet 102, 202, 302, 402, 502 flows into the first flow path P1 through the first entrance 122, 222, 322, 422, 522. A second portion of the exhaust bypasses the first entrance 122, 222, 322, 422, 522 and instead flows into the second flow path P2 through the second entrance 132, 232, 332, 432, 532. The doser mounting location 140, 240, 340, 440, 540 is oriented so that the doser injects reactant into the first flow path P1 and not into the second flow path P2. The first and second portions of the exhaust merge back together at the common flow path P3 and flow together to the outlet 104, 204, 304, 404, 504.

In certain implementations, the first portion of the exhaust includes a majority of the exhaust entering the inlet 102, 202, 302, 402, 502. In certain implementations, the first portion of the exhaust includes at least about 60% of the exhaust entering the inlet 102, 202, 302, 402, 502. In certain implementations, the first portion of the exhaust includes at least about 70% of the exhaust entering the inlet 102, 202, 302, 402, 502. In certain implementations, the first portion of the exhaust includes at least about 80% of the exhaust entering the inlet 102, 202, 302, 402, 502. In certain implementations, the first portion of the exhaust includes at least about 85% of the exhaust entering the inlet 102, 202, 302, 402, 502. In certain implementations, the first portion of the exhaust includes at least about 90% of the exhaust entering the inlet 102, 202, 302, 402, 502. In certain examples, the first portion of the exhaust includes 60%-95% of the exhaust entering the inlet 102, 202, 302, 402, 502. In certain examples, the first portion of the exhaust includes 80%-90% of the exhaust entering the inlet 102, 202, 302, 402, 502.

In certain implementations, the second portion of the exhaust includes a minority of the exhaust entering the inlet 102, 202, 302, 402, 502. In certain implementations, the second portion of the exhaust includes no more than about 40% of the exhaust entering the inlet 102, 202, 302, 402, 502. In certain implementations, the second portion of the exhaust includes no more than about 30% of the exhaust entering the inlet 102, 202, 302, 402, 502. In certain implementations, the second portion of the exhaust includes no more than about 20% of the exhaust entering the inlet 102, 202, 302, 402, 502. In certain implementations, the second portion of the exhaust includes no more than about 15% of the exhaust entering the inlet 102, 202, 302, 402, 502. In certain implementations, the second portion of the exhaust includes no more than about 10% of the exhaust entering the inlet 102, 202, 302, 402, 502. In certain examples, the second portion of the exhaust includes 5%-40% of the exhaust entering the inlet 102, 202, 302, 402, 502. In certain examples, the second portion of the exhaust includes 10%-20% of the exhaust entering the inlet 102, 202, 302, 402, 502.

The conduit arrangement 110, 210, 310, 410, 510 includes a mixing zone Z1, an impact zone Z2, and a merge zone Z3. At the mixing zone Z1, turbulence (e.g., swirling) is applied to the exhaust flowing through the first flow path P1. For example, a tangential velocity is introduced to the exhaust entering the first conduit 120, 220, 320, 420, 520. The exhaust flowing through the first flow path P1 has a higher turbulence intensity than the exhaust flowing through the second flow path P2. In certain examples, turbulence is not applied to exhaust bypassing the first flow path P1 and instead entering the second flow path P2.

The doser mounting location 140, 240, 340, 440, 540 is oriented to face into the first flow path P1. The impact zone Z2 is located downstream of the mixing zone Z1 and upstream of the common flow path P3. The spray path of the reactant intersects the inner surface of the first conduit 120, 220, 320, 420, 520 at the impact zone Z2. A majority of the reactant traveling along the spray path contacts the conduit arrangement at the impact zone Z2. Accordingly, a thin liquid film of reactant may begin to form at the inner surface of the first conduit 120, 220, 320, 420, 520 at the impact zone Z2. The thin liquid film may flow in the same direction as the exhaust flow. The dosing and mixing assembly 100, 200, 300, 400, 500 is configured to retain heat at this surface to inhibit reactant buildup as will be described herein. The more heat that can be added to this liquid film, the faster this liquid film will evaporate and mix with the exhaust. The first conduit 120, 220, 320, 420, 520 also inhibits reactant impact at the second conduit 130, 230, 330, 430, 530 at the impact zone Z2. The merge zone Z3 is located downstream of the impact zone Z2. The first and second flow paths P1, P2 combine to form the common flow path P3 at the merge zone Z3.

For the sake of convenience and ease of understanding, this disclosure refers to the mixing zone Z1, the impact zone Z2, and the merge zone Z3 as three separate zones. However, it will be understood by one of skill in the art that actions need not be fully confined to specific zones. For example, the turbulence applied to the exhaust within the first flow path P1 is initiated in the mixing zone Z1, but may continue within the impact zone Z2 and/or the merge zone Z3. As another example, while a majority of the reactant impacts the conduit arrangement 110, 210, 310, 410, 510 within the impact zone Z2, some of the reactant may impact the conduit arrangement 110, 210, 310, 410, 510 within the mixing zone Z1 and/or the merge zone Z3.

In certain implementations, the conduit arrangement includes a first conduit 120, 220, 320, 420, 520 defining the first flow path P1 and a second conduit 130, 230, 330, 430, 530 surrounding at least a segment of the first conduit 120, 220, 320, 420, 520 to form the second flow path P2 between the first and second conduits 120, 220, 320, 420, 520, 130, 230, 330, 430, 530. In certain examples, the second conduit 130, 230, 330, 430, 530 is coaxial with the first conduit 120, 220, 320, 420, 520. Each of the conduits 120, 220, 320, 420, 520, 130, 230, 330, 430, 530 extends between respective first and second axial ends 124, 224, 324, 424, 524, 126, 226, 326, 426, 526 and 134, 234, 334, 434, 534, 136, 236, 336, 436, 536. In certain examples, the first conduit 120, 220, 320, 420, 520 includes a generally tubular body extending between the first and second axial ends 124, 224, 324, 424, 524, 126, 226, 326, 426, 526. In the example shown, the tubular body has a constant cross-dimension. In other examples, the body may have a frustoconical shape or otherwise have a non-constant cross-dimension. In certain examples, the first and second conduits 120, 220, 320, 420, 520, 130, 230, 330, 430, 530 are tubular and the second flow path P2 is ring-shaped.

In certain examples, the second flow path P2 has a cross-sectional area that is smaller than a cross-sectional area of the first flow path P1. For example, the second flow path P2 may have a cross-sectional area that is 5-70% of the cross-sectional area of the first flow path P1. In certain examples, the cross-sectional area of the second flow path P2 is 10-65% of the cross-sectional area of the first flow path P1. In certain examples, the cross-sectional area of the second flow path P2 is 5-50% of the cross-sectional area of the first flow path P1. In certain examples, the cross-sectional area of the second flow path P2 is 5-35% of the cross-sectional area of the first flow path P1.

In certain implementations, the first conduit 120, 220, 320, 420, 520 defines the mixing zone Z1. In certain implementations, a mixer 128, 228, 328, 428, 528 is disposed at the first end 124, 224, 324, 424, 524 of the first conduit 120, 220, 320, 420, 520. The mixer 128, 228, 328, 428, 528 is configured to induce swirling of exhaust or other forms of turbulence as the exhaust flows through the first conduit 120, 220, 320, 420, 520. In certain examples, the mixer 128, 228, 328, 428, 528 includes a plurality of louvered openings 129, 229, 329, 429, 529 defined by the first conduit 120, 220, 320, 420, 520. For example, the louvered openings 129, 229, 329, 429, 529 may extend along part or all of the circumference of the first conduit 120, 220, 320, 420, 520 at the first end 124, 224, 324, 424, 524 of the first conduit 120, 220, 320, 420, 520. In such examples, the louvered openings 129, 229, 329, 429, 529 define the entrance 122, 222, 322, 422, 522 to the first conduit 120, 220, 320, 420, 520. In an example, the louvered openings 129, 229, 329, 429, 529 include vanes disposed at elongated slots. In another example, the louvered openings 129, 229, 329, 429, 529 include scoops disposed at rounded or oblong holes. In other examples, the mixer 128, 228, 328, 428, 528 may include other tangential velocity-imparting members. In still other examples, turbulence may be otherwise applied to the exhaust at the mixing zone Z1.

The mixing zone Z1 is configured so that the intensity of the turbulence (e.g., swirling) induced within the first conduit 120, 220, 320, 420, 520 is greater than the intensity of any turbulence (e.g., swirling) between the first and second conduits. Turbulence intensity is quantified as a ratio between momentums as follows:

$$\frac{\text{Momentum of turbulent flow fluctuations}}{\text{Momentum of bulk flow movement}} \qquad (1)$$

For each point along the conduit axis L of the conduit arrangement, the turbulence intensity of the exhaust within the first flow path P1 is higher than the turbulence intensity of the exhaust within the second flow path P2 regardless of the mass flow rate passing through the conduit arrangement.

In certain implementations, the turbulence intensity for the exhaust traveling along the first flow path is at least 15%. In certain implementations, the turbulence intensity for the exhaust traveling along the first flow path ranges between 30% and 5%, decreasing along the flow direction. In certain implementations, the turbulence intensity for the exhaust traveling along the first flow path ranges between 25% and 15%, decreasing along the flow direction. In certain implementations, the turbulence intensity for the exhaust traveling along the first flow path ranges between 20% and 10%, decreasing along the flow direction. In certain implementations, the turbulence intensity for the exhaust traveling along the first flow path ranges between 3% and 20%, decreasing along the flow direction.

In certain implementations, the turbulence intensity for the exhaust traveling along the second flow path is at least 5%. In certain implementations, the turbulence intensity for the exhaust traveling along the second flow path is no more than 20%. In certain implementations, the turbulence intensity for the exhaust traveling along the second flow path ranges between 20% and 5%, decreasing along the flow direction. In certain implementations, the turbulence intensity for the exhaust traveling along the second flow path ranges between 20% and 10%, decreasing along the flow direction. In certain implementations, the turbulence intensity for the exhaust traveling along the first flow path ranges between 15% and 5%, decreasing along the flow direction.

Figure 4:
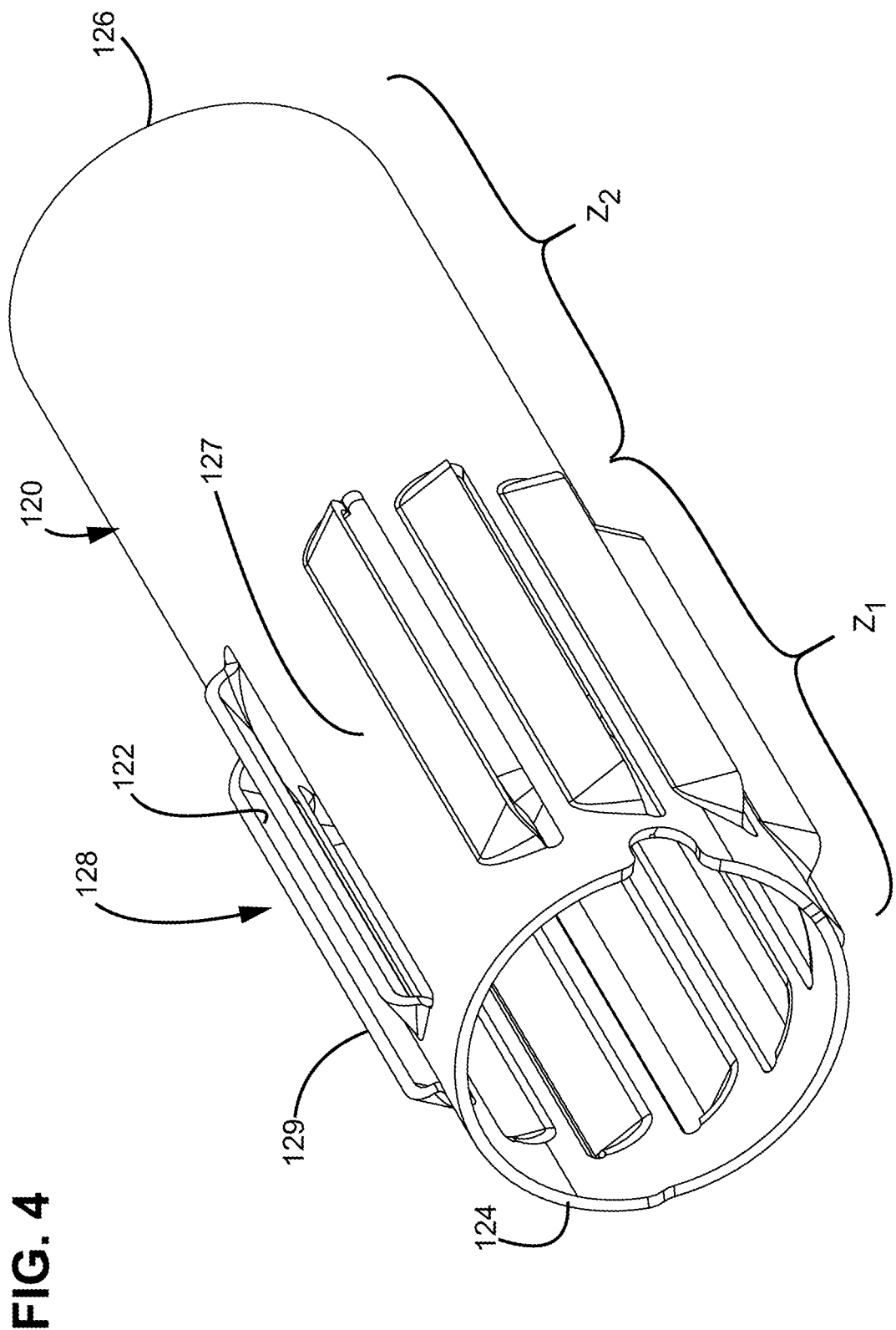
FIG. 4 is a first perspective view of an example first conduit suitable for use with the conduit arrangement of the dosing and mixing assembly of FIG. 1.
Figure 5:
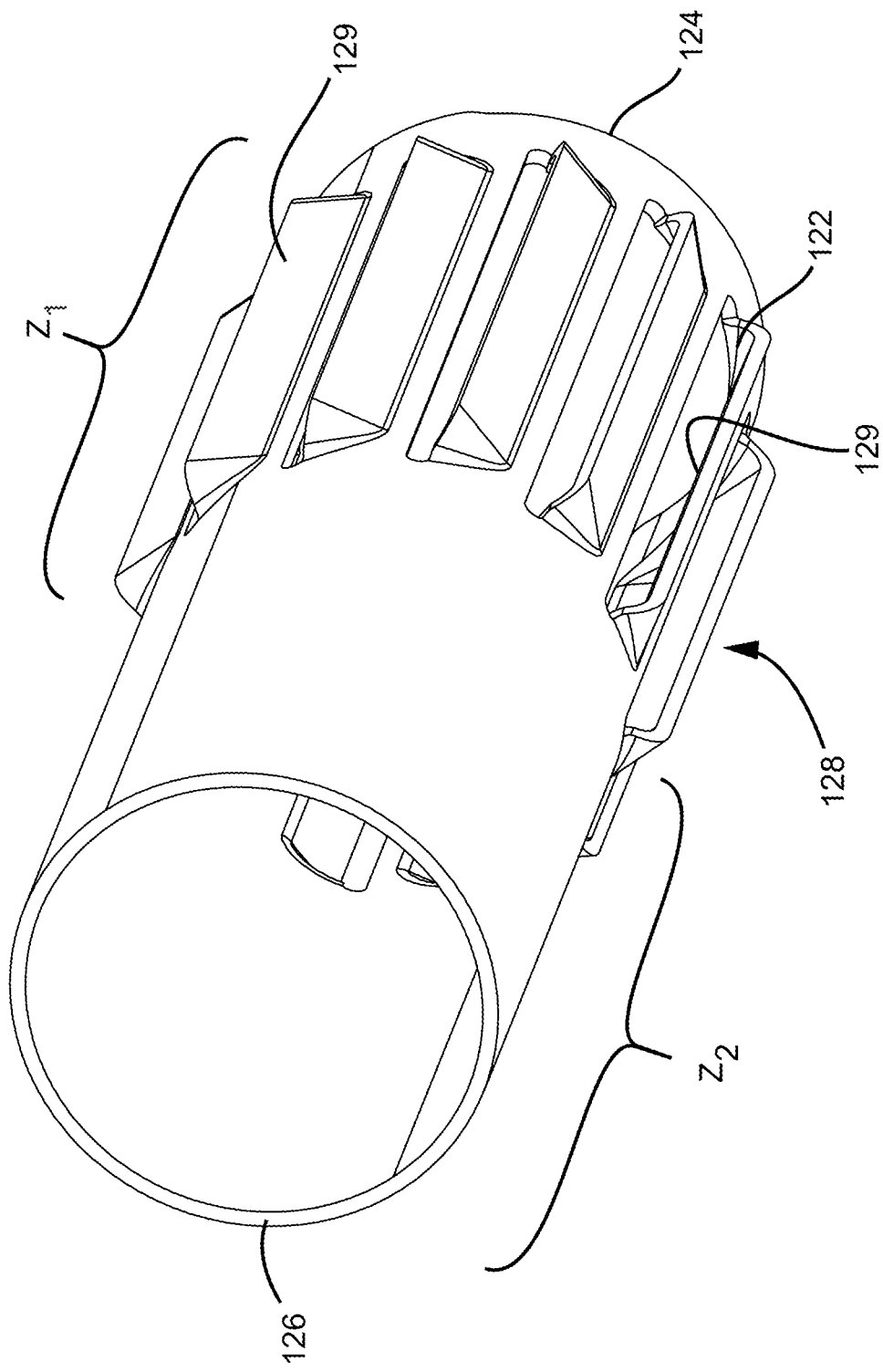
FIG. 5 is a second perspective view of the first conduit of FIG. 4.
Figure 6:
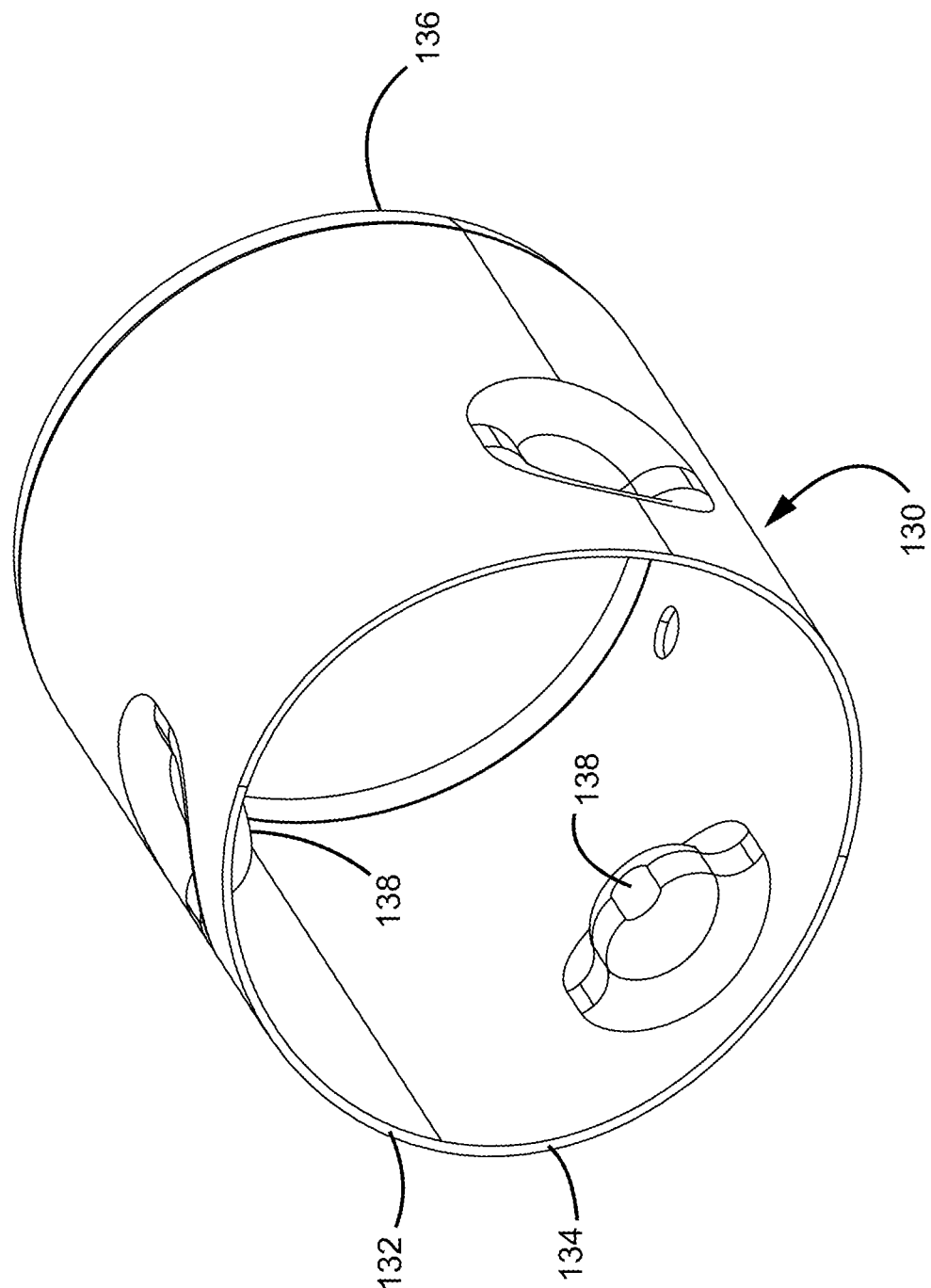
FIG. 6 is a perspective view of an example second conduit suitable for use with the dosing and mixing assembly of FIG. 1.
Figure 7:
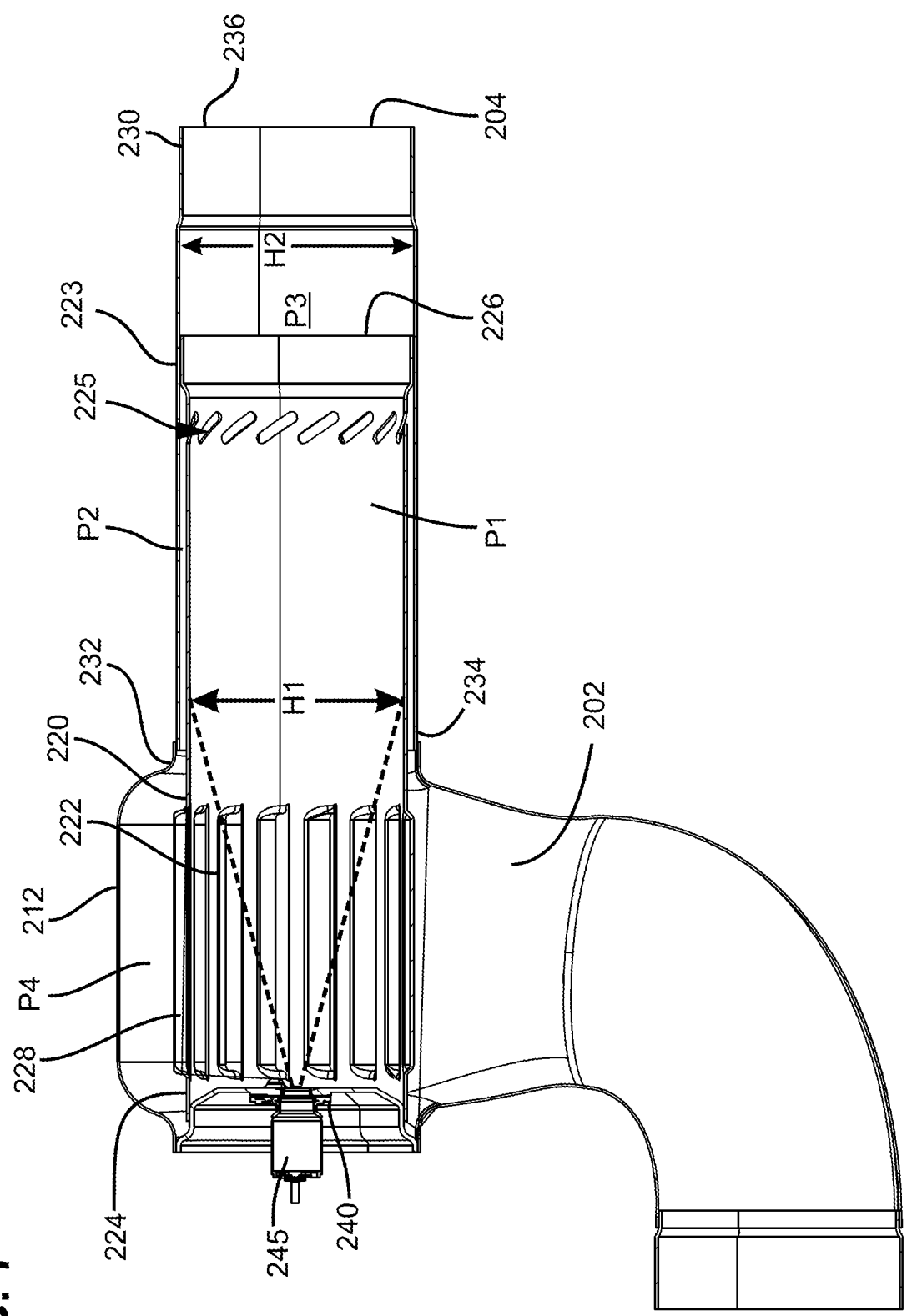
FIG. 7 is a perspective view of a second example dosing and mixing assembly including a conduit arrangement defining a mixing zone, an impact zone, and a merge zone in accordance with the principles of the present disclosure.
Figure 8:
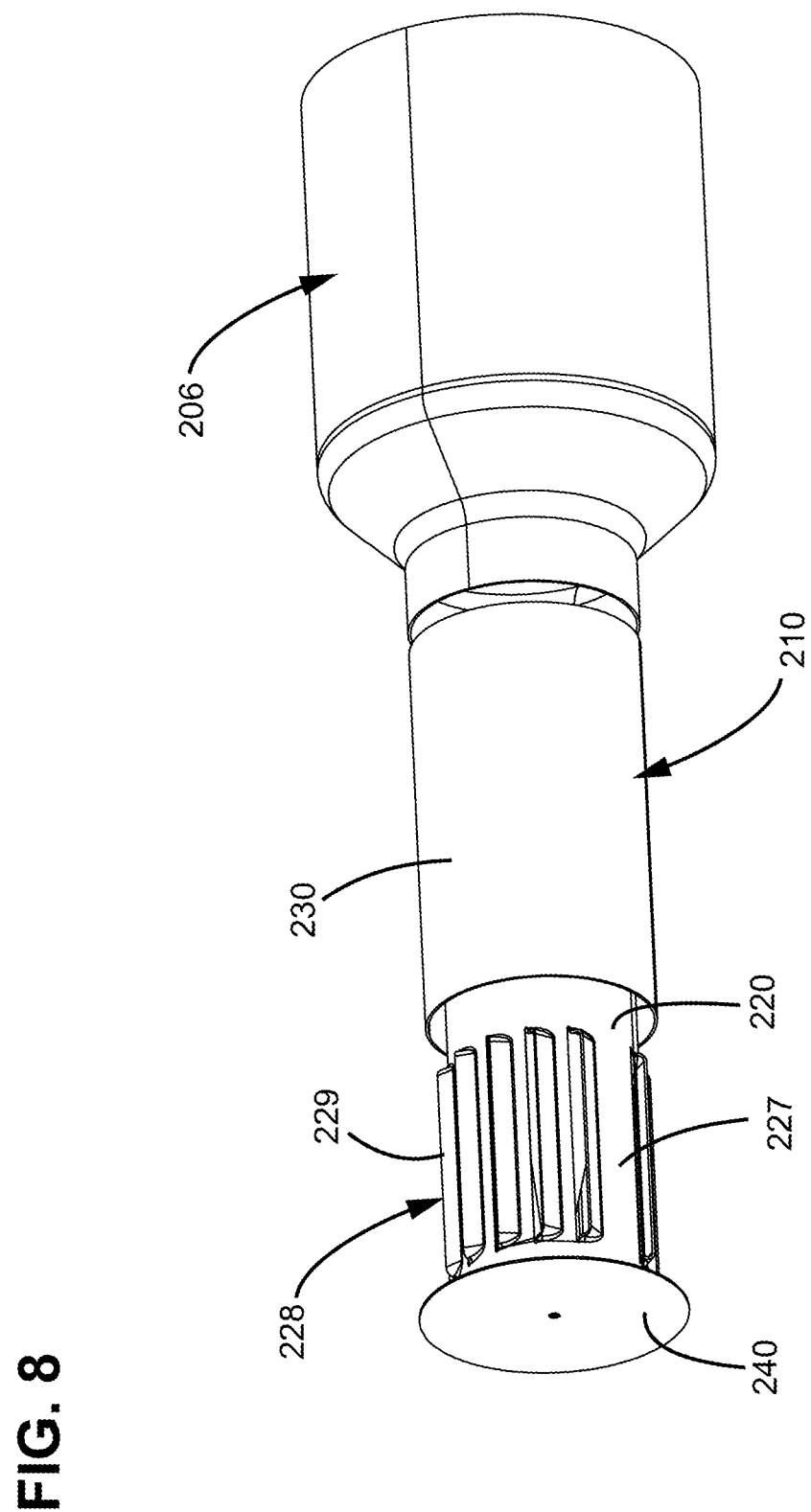
FIG. 8 is a perspective view of at least part of the conduit arrangement of FIG. 7 aligned with a treatment substrate.
Figure 9:
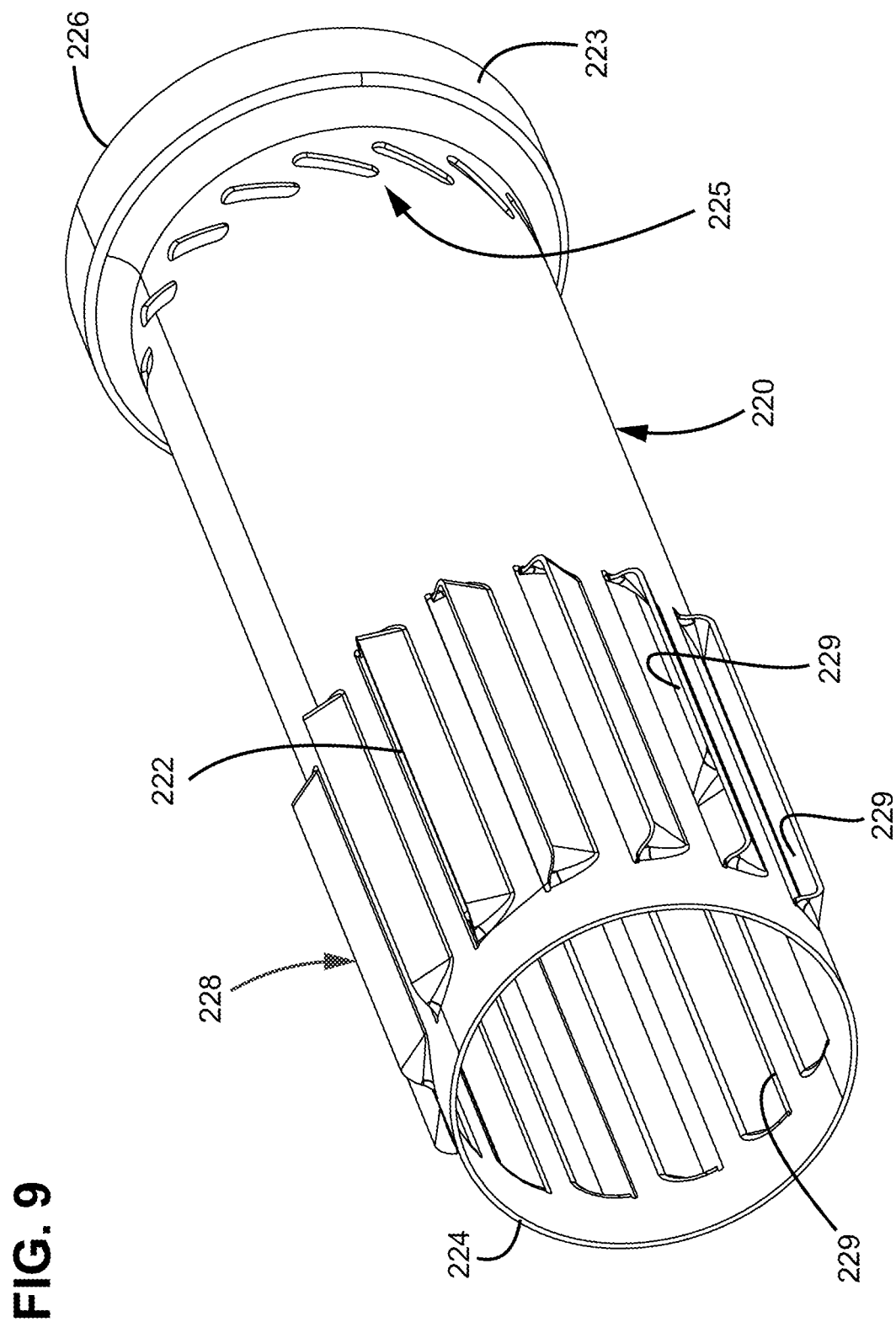
FIG. 9 is a first perspective view of an example first conduit suitable for use with the conduit arrangement of the dosing and mixing assembly of FIG. 7.
Figure 10:
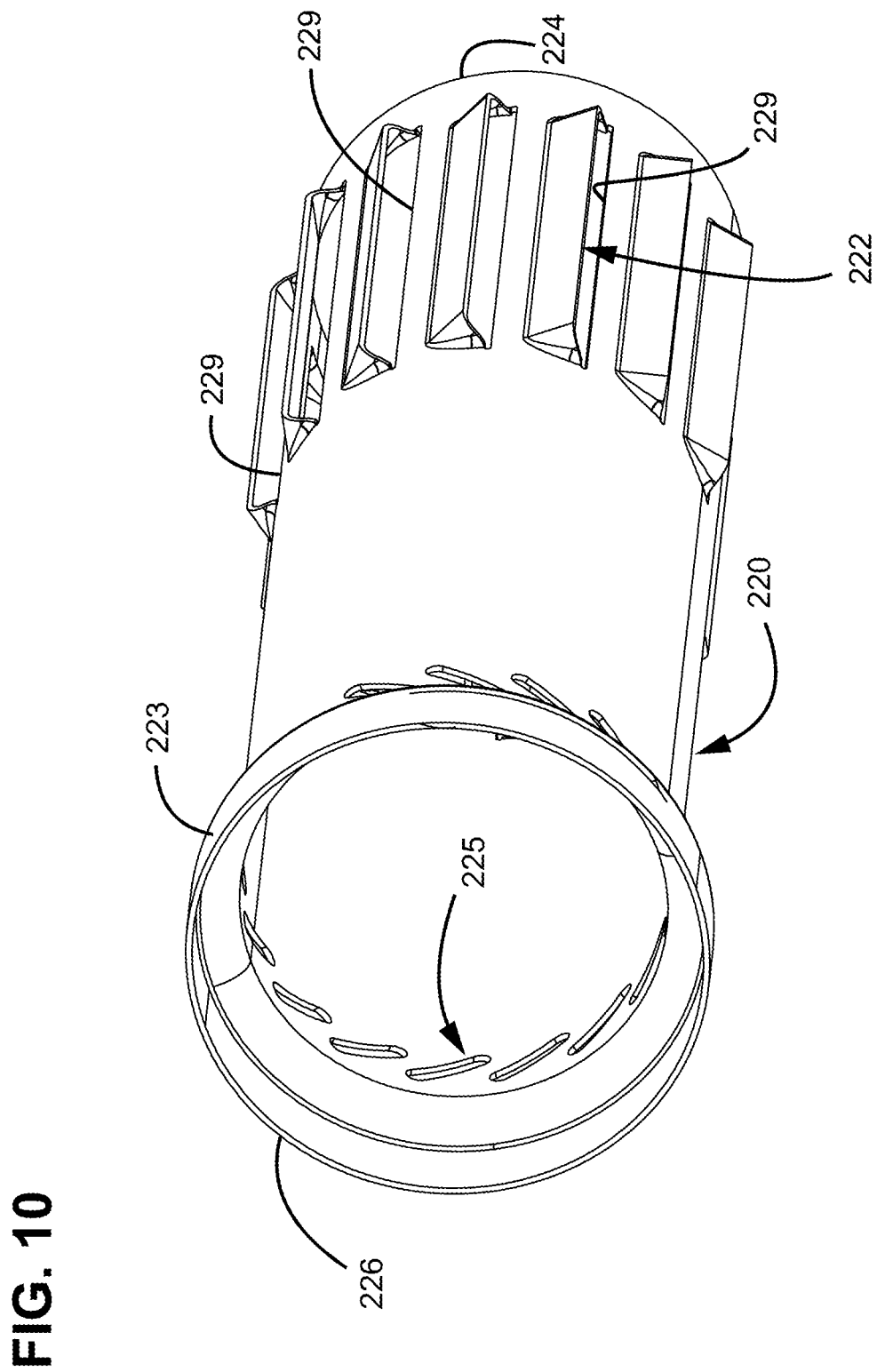
FIG. 10 is a second perspective view of the first conduit of FIG. 9.
Figure 11:
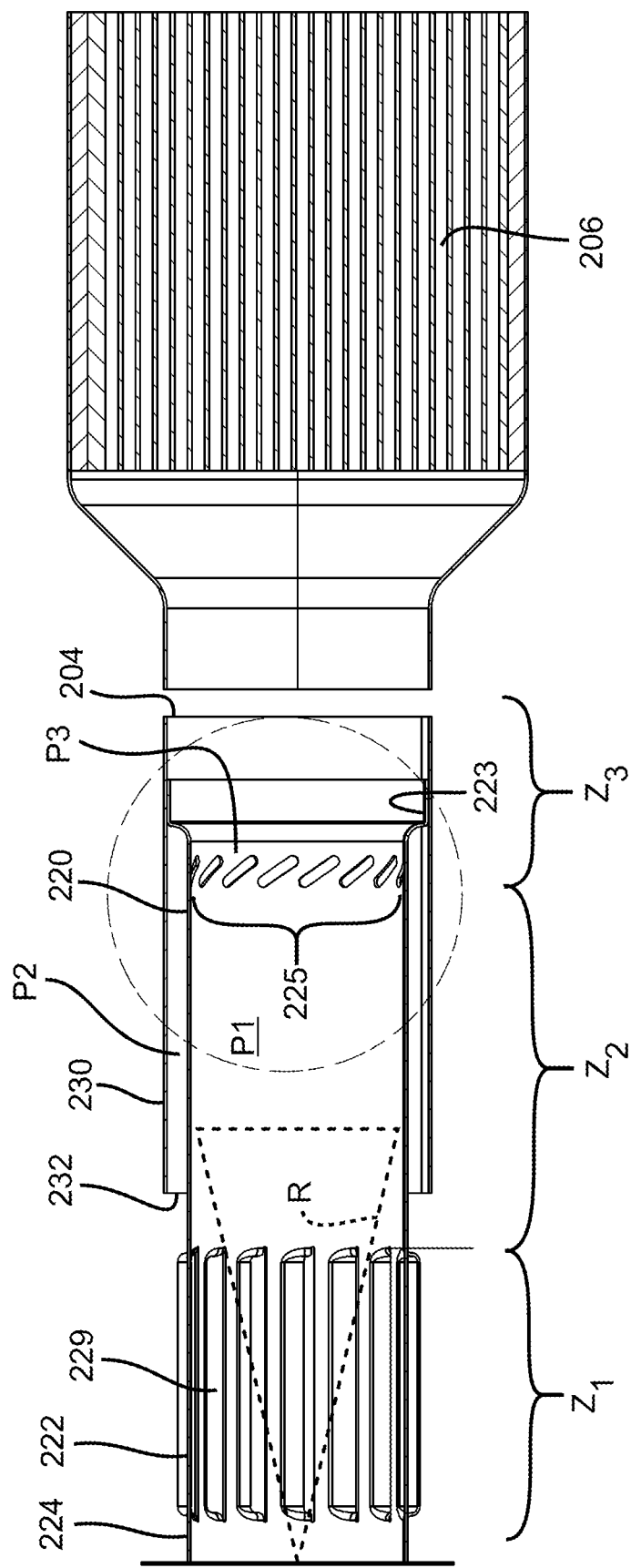
FIG. 11 is a longitudinal cross-sectional view of the conduit arrangement of FIG. 8.
Figure 28:
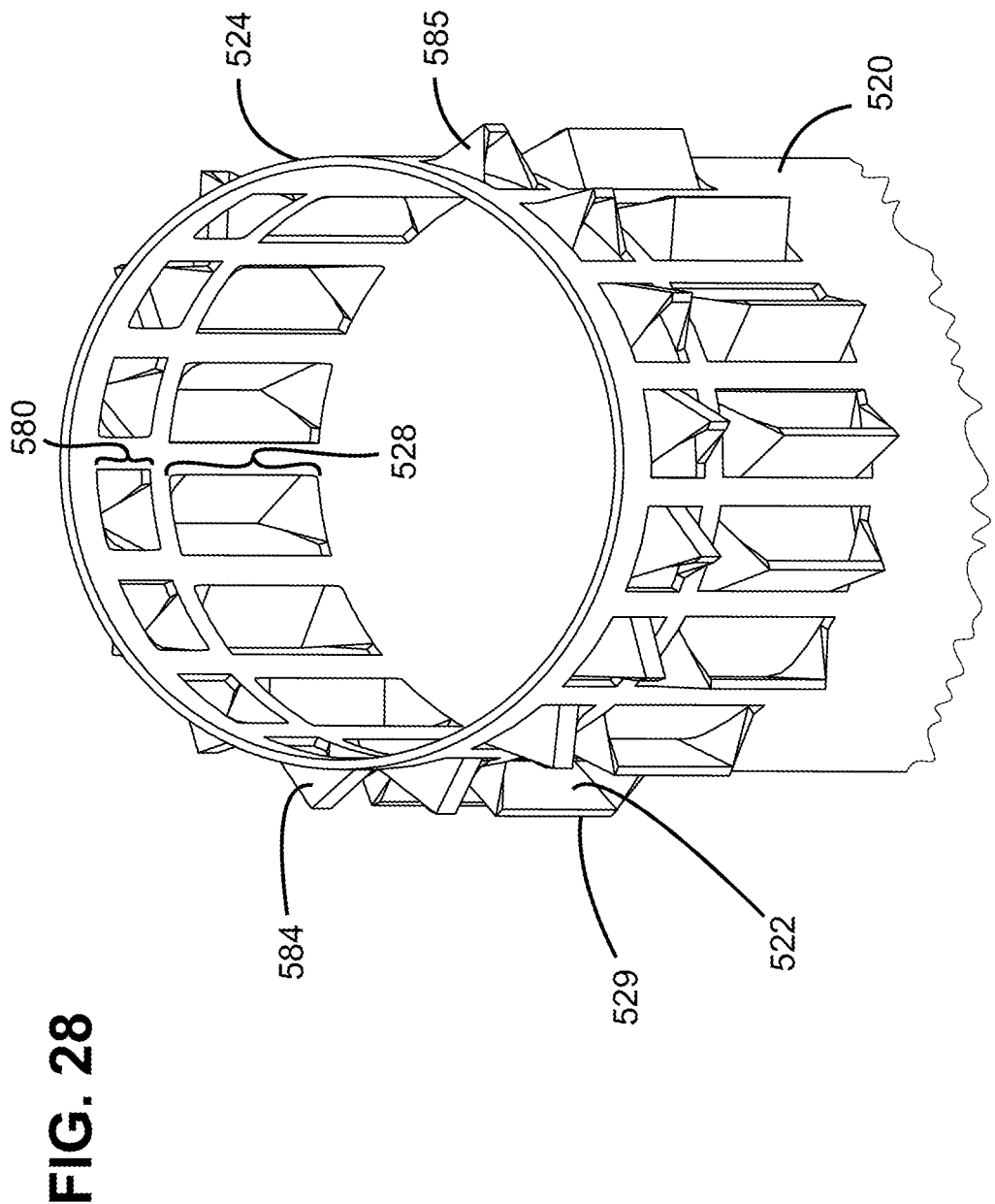
FIG. 28 is a perspective view of an example first conduit suitable for use in the fifth dosing and mixing assembly, the first conduit defining a mixing zone and a spray protection zone.

In the examples shown in FIGS. 4, 8, and 28, the first conduit 120, 220, 520 includes a non-louvered circumferential section 127, 227, 527 (i.e., a section in which the adjacent louvered openings 129, 229, 529 are circumferentially spaced further from each other compared to the remainder of the adjacent louvered openings 129, 229, 529). For example, the non-louvered section 127, 227, 527 may face the inlet 102, 202, 502 or an outlet of an upstream substrate 108, 508 to guide the exhaust around the mixer input flow path P4, thereby evening out the distribution of the exhaust at the louvered openings 129, 229, 529 instead of concentrating the exhaust at a louvered opening 129, 229, 529 facing the inlet or substrate outlet. In the example shown in FIG. 23, the first conduit 320 includes two non-louvered circumferential sections 327 disposed opposite each other. The inclusion of oppositely disposed non-louvered circumferential sections 327 results in symmetrical flow along the first flow path P1. It will be understood that the oppositely disposed non-louvered circumferential sections can be implemented in the first conduits 120, 220, 320, 420, 520 of any of the dosing and mixing assemblies 100, 200, 300, 400, 500 disclosed herein.

In some implementations, the first conduit 120, 220, 320, 420, 520 defines the impact zone Z2. For example, the first conduit 120, 220, 320, 420, 520 may define a continuous inner surface at the impact zone Z2. In certain implementations, a majority of the reactant passing through the conduit arrangement contacts the first conduit 120, 220, 320, 420, 520 along the impact zone Z2. Accordingly, the first conduit 120, 220, 320, 420, 520 inhibits the reactant from passing radially beyond the first conduit 120, 220, 320, 420, 520 before reaching the merge zone Z3. In some implementations, the continuous inner surface has a constant cross-dimension (e.g., diameter) along the impact zone Z2. In other implementations, the continuous inner surface is profiled along the impact zone Z2.

In some implementations, the second conduit 130, 230, 330, 430, 530 has a constant cross-dimension (e.g., diameter) as it extends around the impact zone Z2. In other implementations, the portion of the second conduit 130, 230, 330, 430, 530 surrounding the impact zone Z2 is profiled. For example, the second conduit 130, 230, 330, 430, 530 may be corrugated, textured, or otherwise have an uneven profile in the space around the impact zone Z2 to increase the surface area of the conduit 130, 230, 330, 430, 530. The increased surface area transfers an increased amount of heat from the second flow path P2 to the first flow path P1, which helps to maintain a high wall temperature at the impact zone Z2 and mitigate cooling caused by the impact of the reactant at the impact zone Z2. In other implementations, a separate, profiled structure (e.g., a corrugated ring) may be disposed within the second flow path P2 between the first and second conduits 120, 220, 320, 420, 520, 130, 230, 330, 430, 530.

In certain implementations, the doser mounting location 140, 240, 340, 440, 540 is disposed at the first axial end 124, 224, 324, 424, 524 of the first conduit 120, 220, 320, 420, 520 at or upstream of the mixing zone Z1. The doser mounting location 140, 240, 340, 440, 540 is positioned to orient a doser 145, 245, 345, 445, 545 mounted thereto to dispense a reactant along a spray path R leading to the impact zone Z2 of the first conduit 120, 220, 320, 420, 520. In certain examples, the spray path R extends along the conduit axis L. In certain examples, the spray path R has a conical shape centered about the conduit axis L. The impact zone Z2 is located downstream of the second entrance 132, 232, 332, 432, 532 of the second conduit 130, 230, 330, 430, 530. The reactant does not enter the second flow path P2 between the two conduits 120, 220, 320, 420, 520, 130, 230, 330, 430, 530. As the reactant travels along the spray path R within the first conduit 120, 220, 320, 420, 520, the reactant is mixed with the turbulent exhaust traveling along the first flow path P1.

In certain implementations, the first conduit 120, 220, 320, 420, 520 includes a peripherally extending wall shared by the first and second flow paths P1, P2. The shared common wall defines the continuous inner surface at the impact zone Z2. The second flow path P2 insulates the shared common wall at the impact zone Z2. Heated exhaust passing through the second flow path P2 surrounds the first conduit 120, 220, 320, 420, 520 at the impact zone Z2. Heat may transfer from the exhaust traveling through the second flow path P2 to the first conduit 120, 220, 320, 420, 520. Further, a profiled surface area of the impact zone Z2 may increase the amount of heat that can transfer from the exhaust to the continuous inner surface. In certain implementations, a heat transfer structure can be disposed within the second flow path P2. For example, a profiled heat-conducting insert may form channels defining the second flow path P2.

Heating the first conduit 120, 220, 320, 420, 520 aids in retaining heat within the first flow path P1. For example, the transferred heat may counteract cooling of the inner surface of the first conduit 120, 220, 320, 420, 520 where impacted by the reactant. Further, the heated gap between the first conduit 120, 220, 320, 420, 520 and an exterior of the conduit arrangement 110, 210, 310, 410, 510 inhibits heat dissipation to the surrounding environment. Conserving heat within the first flow path P1 facilitates evaporation of the reactant and inhibits deposit formation of the reactant within the first conduit 120, 220, 320, 420, 520.

In certain implementations, the conduit arrangement 110, 210, 320, 420, 520 also includes a housing 112, 212, 312, 412, 512 surrounding at least the mixing zone Z1 of the first conduit 120, 220, 320, 420, 520. The housing 112, 212, 312, 412, 512 is configured to direct exhaust towards the mixer 128, 228, 328, 428, 528 of the first conduit 120, 220, 320, 420, 520. In the example shown, the housing 112, 212, 312, 412, 512 forms a mixer input flow path P4 extending circumferentially around the louvered openings 129, 229, 329, 429, 529 of the first conduit 120, 220, 320, 420, 520 (see FIGS. 3, 7, 22, 26, and 27). In certain examples, the housing 112, 212, 312, 412, 512 defines the doser mounting location 140, 240, 340, 440, 540. In certain examples, the first axial end 124, 224, 324, 424, 524 of the first conduit 120, 220, 320, 420, 520 couples to the housing 112, 212, 312, 412, 512 at the doser mounting location 140, 240, 340, 440, 540. In the example shown, the first axial end 124, 224, 324, 424, 524 of the first conduit 120, 220, 320, 420, 520 mounts to a doser mounting unit mounted to the housing 112, 212, 312, 412, 512 at the doser mounting location 140, 240, 340, 440, 540. In other examples, the first conduit 120, 220, 320, 420, 520 may be otherwise coupled to the housing 112, 212, 312, 412, 512.

In certain implementations, the housing 112, 212, 312, 412, 512 couples to the second conduit 130, 230, 330, 430, 530 at the first axial end 134, 234, 334, 434, 534 of the second conduit 130, 230, 330, 430, 530. In other implementations, the housing 112, 212, 312, 412, 512 surrounds the second conduit 130, 230, 330, 430, 530. In some implementations, the housing 112, 212, 312, 412, 512 contains the upstream substrate 108, 308, 408, 508. In other implementations, the housing 112, 212, 312, 412, 512 couples to a housing that contains the upstream substrate 108, 308, 408, 508.

Referring now to FIGS. 1-6, a first example dosing and mixing assembly 100 is shown. In the first dosing and mixing assembly 100, the second conduit 130 includes a generally tubular body extending between the first and second axial ends 134, 136. In the example shown, the tubular body has a generally constant cross-dimension. In certain implementations, the second conduit 130 includes dimples 138, tabs, or other such features that help to align the second conduit 130 with the first conduit 120. In certain examples, the dimples 138 extend radially inwardly and contact the first conduit 120. In certain examples, the dimples 138 are secured to the first conduit 120 (e.g., by welding) to hold the second conduit 130 axially and rotationally fixed relative to the first conduit 120.

A third entrance to the third flow path P3 is defined at the merge zone Z3. In the example shown, the second axial end 126 of the first conduit 120 extends past the second axial end 136 of the second conduit 130 and the third entrance is defined at the second axial end 126 of the first conduit 120. The second portion of the exhaust flowing through the second flow path P2 merges with the first portion of the exhaust flowing through the first flow path P1 when the second portion passes the second axial end 126 of the first conduit 120. In certain implementations, the conduit arrangement 110 includes a third conduit 150 that defines the merge zone Z3.

In certain implementations, insulation can be disposed about at least some of the conduit arrangement 110 to inhibit heat dissipation. Maintaining the heated temperature within the conduit arrangement inhibits reactant deposit formation within the conduit arrangement 110. In certain implementations, the insulation is disposed about the conduit arrangement 110 at the impact zone Z2. In certain implementations, the insulation is disposed about the conduit arrangement 110 at the impact zone Z2 and the merge zone Z3. In certain examples, the mixing zone Z1 also may be insulated.

The third conduit 150 is mounted to the second conduit 130. For example, the third conduit 150 can be secured to the second conduit 130 using a clamp C or other fastener. In certain examples, the third conduit 150 is mounted to the second conduit 130 at a coupling location that is radially aligned with the first conduit 120. In certain examples, the coupling location is radially aligned with the impact zone Z2 of the first conduit 120. In certain implementations, the insulation is reduced or absent at the location of the clamp C. However, the heated exhaust traveling through the second flow path P2 insulates the impact zone Z2 from the external environment at the coupling location. For example, the heated exhaust in the second flow path P2 flows between the clamp C or other fastener—which may otherwise dissipate heat at the coupling location—and the first conduit 120 at the impact zone Z2.

Referring to FIGS. 7-13, a second example dosing and mixing assembly 200 is shown. In the second dosing and mixing assembly 200, the second conduit 230 includes a generally tubular body extending between the first and second axial ends 234, 236. In the example shown, the tubular body has a generally constant cross-dimension. In some implementations, the second conduit 230 mounts to the housing 212. In other implementations, the second conduit 230 is integrally formed with the housing 212. The second axial end 236 of the second conduit 230 extends past the second axial end 226 of the first conduit 220 along the conduit axis L.

In certain implementations, the first conduit 220 defines the mixing zone Z1, the impact zone Z2, and at least a portion of the mixing zone Z3. The first conduit 220 defines the mixing zone Z1 at the mixer 228. For example, the mixer 128, 228 may impart a tangential velocity (e.g., swirl) to the first portion of the exhaust passing through the first flow path P1. The first conduit 220 defines the impact zone Z2 between the mixing zone Z1 and the merge zone Z3. In certain examples, the merge zone Z3 is also partially defined by the second conduit 230 extending beyond the first conduit 220.

The first conduit 220 has a first cross-dimension (e.g., diameter) H1 at the impact zone Z2 that is smaller than a second cross-dimension H2 of the second conduit 230. The difference between the cross-dimensions H1, H2 provides the second flow passage P2. The first conduit 220 has an enlarged section 223 at the second axial end 226. The enlarged section 223 extends radially outwardly to the second conduit 230, thereby cutting off the second flow path P2 at the second axial end 226 of the first conduit 220. For example, an outer periphery of the enlarged section 223 contacts an inner surface of the second conduit 230.

At the merge zone Z3, a third entrance is provided to the third flow path P3 from the first and second flow paths P1, P2. In the example shown, the first conduit 220 defines one or more apertures 225 that define the third entrance. The one or more apertures 225 extend between the first and second flow paths P1, P2. Accordingly, exhaust flowing through the second flow path P2 passes through the one or more apertures 225 to enter the first conduit 220 and joins with the exhaust flowing through the first flow path P1. In certain implementations, multiple apertures 225 extend along a circumference of the first conduit 220. In an example, the apertures 225 are circumferentially aligned in a ring. In other examples, the apertures 225 may form multiple rings. In other examples, the apertures 225 are not circumferentially aligned.

When the second portion of the exhaust passes into the first conduit 220 through the apertures 225 from the second flow path P2, the second portion of the exhaust is mixed with the first portion of the exhaust. Accordingly, the second portion of the exhaust is entrained into the mixing (e.g., swirling) flow of the first portion of the exhaust at the merge zone Z3. Accordingly, the merged exhaust also may flow in the turbulent pattern (e.g., a swirl). The mixing exhaust flows through the common flow path P3 to the outlet 204. In certain examples, the common flow path P3 is defined by the portion of the first conduit 220 defining the apertures 225, the enlarged portion 223 of the first conduit 220, and the portion of the second conduit 230 that extends beyond the second axial end 226 of the first conduit 220. In certain implementations, the outlet 204 leads to a treatment substrate 206 (e.g., a catalytic treatment substrate).

Figure 12:
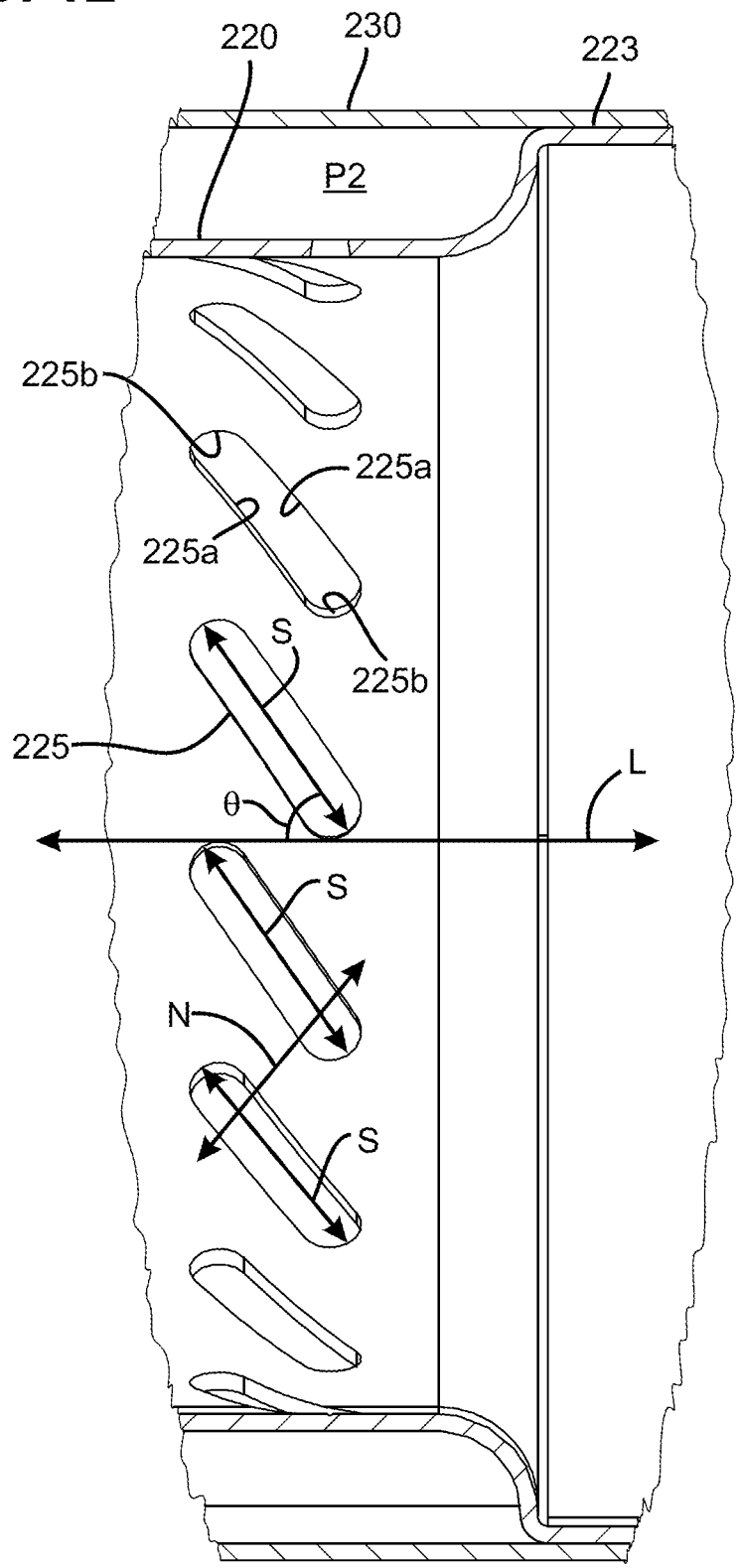
FIG. 12 is an enlarged view of a portion of the conduit arrangement of FIG. 11.

Referring to FIG. 12, in certain implementations, each aperture 225 is elongate along a slot axis S. In certain implementations, each aperture 225 has a pair of straight edges 225a connected by ends 225b. The slot axis S extends between the ends 225b. In certain examples, the straight edges 225a are at least twice as long as the ends 225b. In certain examples, the ends 225b are curved. In certain examples, each aperture 225 has an oblong profile. In certain implementations, the apertures 225 are oriented and spaced so that adjacent apertures 225 overlap (e.g., portions of the straight edges 225a of the adjacent apertures 225 overlap) when viewed along a reference axis N extending perpendicular to the slot axis S.

Each aperture 225 is oriented so that the slot axis S is angled relative to the conduit axis L. In certain implementations, an angle θ between the slot axis S and the conduit axis L is between about 5 degrees and about 85 degrees. In certain implementations, the angle θ is between about 25 degrees and about 75 degrees. In certain implementations, the angle θ is between about 30 degrees and about 60 degrees. In certain implementations, the angle θ is between about 40 degrees and about 50 degrees. In an example, the angle θ is about 45 degrees.

Figure 21:
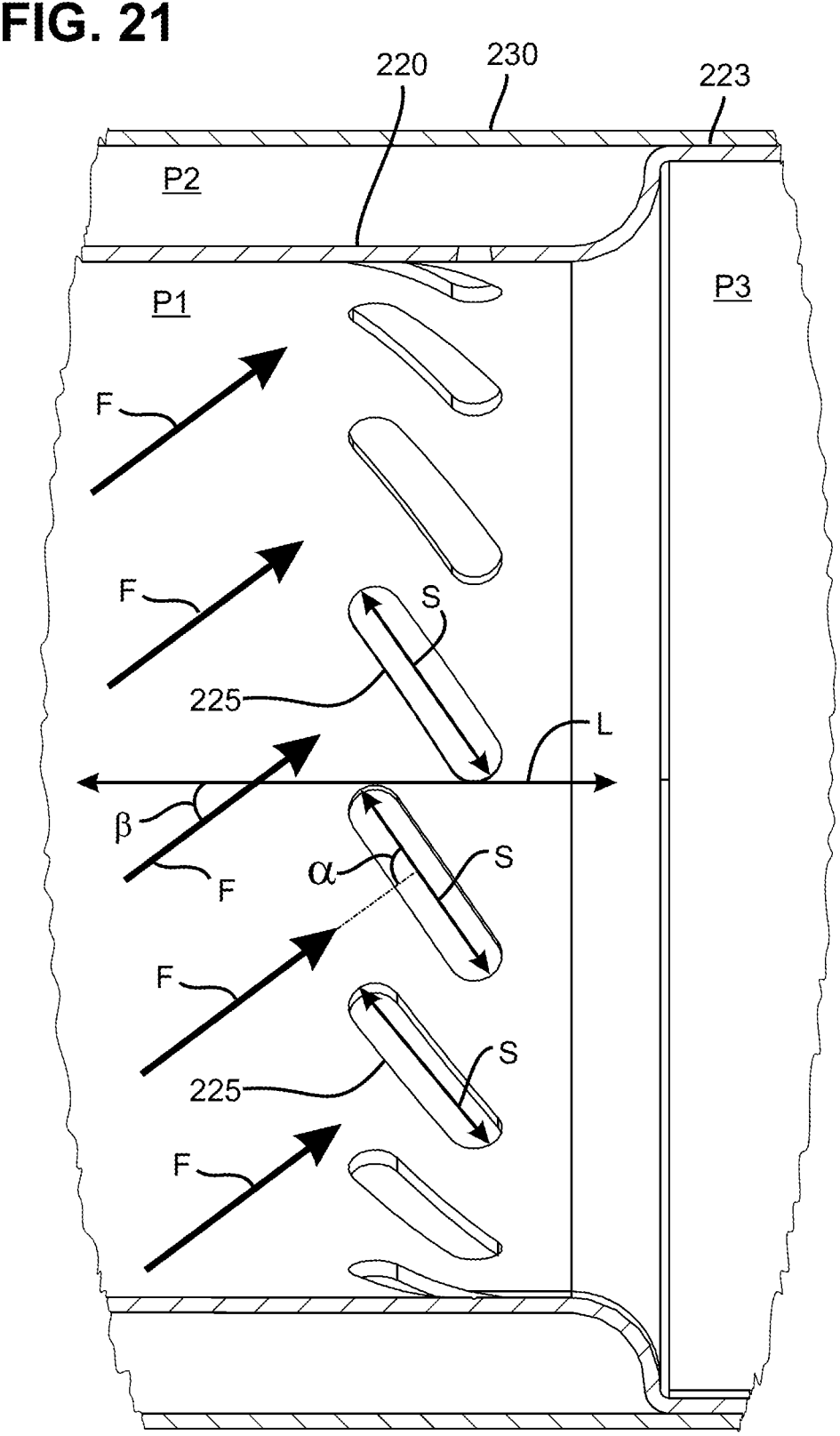
FIG. 21 is the enlarged view of FIG. 12 with the local exhaust flow path lines illustrated.
Figure 22:
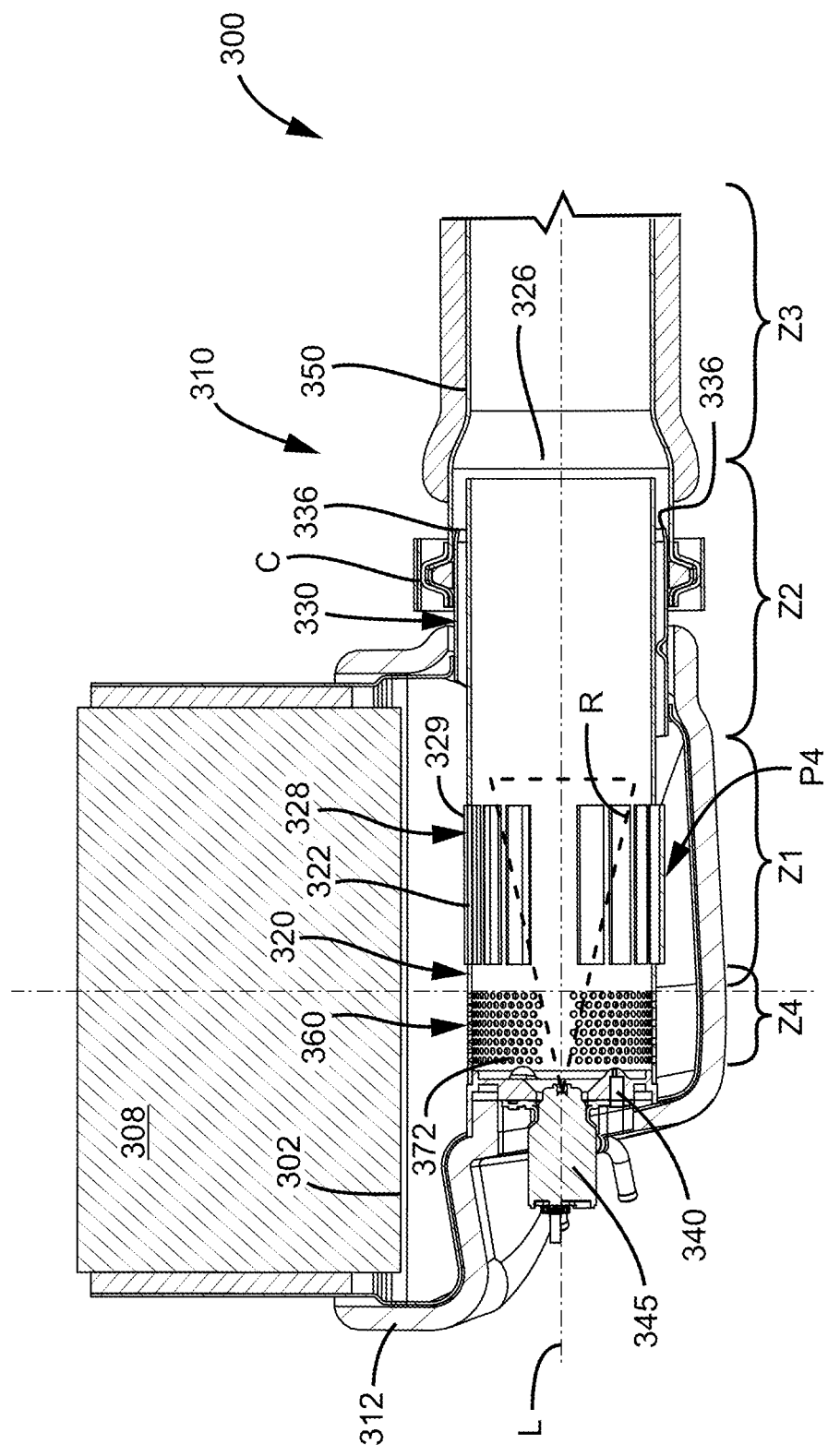
FIG. 22 is a longitudinal cross-sectional view of a third example dosing and mixing assembly including a conduit arrangement defining a spray path protection zone, mixing zone, an impact zone, and a merge zone in accordance with the principles of the present disclosure.

Referring to FIG. 21, in certain implementations, exhaust flows past the apertures 225 in a turbulent pattern so that local flow path lines F of the exhaust passing the apertures 225 are not coaxial with the conduit axis L. In certain examples, the exhaust passing the apertures 225 is moving in a swirling pattern. In certain implementations, the local flow path lines F of the exhaust passing the apertures 225 extend at an angle β relative to the conduit axis L. In certain implementations, an angle between the local flow path lines F and the conduit axis L is between about 5 degrees and about 85 degrees. In certain implementations, the angle β is between about 25 degrees and about 75 degrees. In certain implementations, the angle β is between about 30 degrees and about 60 degrees. In certain implementations, the angle β is between about 40 degrees and about 50 degrees. In an example, the angle β is about 45 degrees.

The local flow path lines F of the exhaust near the apertures 225 in the conduit wall extend at a second angle α relative to the slot axes S. In an implementation, the local flow path lines F of the exhaust near the conduit wall defining the apertures 225 extend at an angle α of about 90 degrees. In certain implementations, the angle α is between about 80 degrees and about 100 degrees. In other implementations, the angle α is between about 60 degrees and about 120 degrees. In certain implementations, the local flow path lines F extend at angles α relative to the slot axes S of between about 30 degrees and about 150 degrees. In certain implementations, the angle α is between about 45 degrees and about 135 degrees.

Referring to FIGS. 12 and 21, a liquid film of reactant deposited on the inner surface of the first conduit 220 at or near the impact zone Z2 is pushed along the conduit wall towards one of the apertures 225. In certain implementations, the apertures 225 are oriented so that the exhaust passes generally transversely over elongate sides of the apertures 225. For example, the deposited liquid film may be guided (e.g., pushed) towards the upstream straight edge 225a of each aperture 225. In certain examples, the deposited liquid film also may be guided towards the downstream straight edges 225a of each aperture 225. When the apertures 225 are oriented transverse to the local flow path lines F and spaced to overlap each other, any deposited reactant propelled by the exhaust will encounter one of the apertures 225.

In certain examples, a liquid film of reactant will accumulate at the straight edges 225a of the apertures 225. In certain examples, when sufficient reactant accumulates into a droplet, the droplet will be entrained by the mixing (e.g., swirling) flow of exhaust. For example, the exhaust passing through the apertures 225 from the second flow path P2 may blow the droplet into the common flow path P3. Accordingly, the exhaust will remove the droplet of reactant from the inner surface of the first conduit 220 to reintroduce the reactant into the exhaust flow. The reintroduced reactant will mix with the exhaust as the exhaust and reactant travel down the combined flow path P3.

Figure 13:
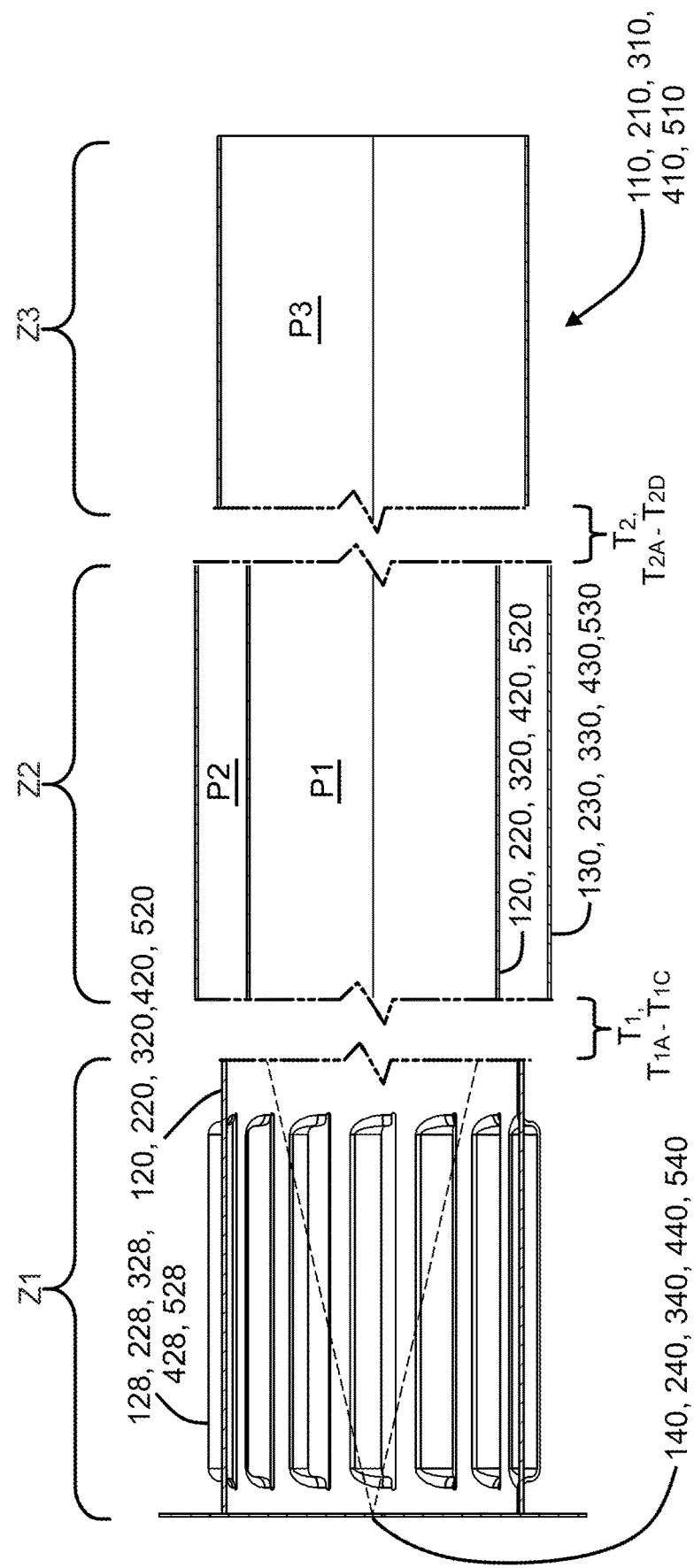
FIG. 13 is a longitudinal cross-sectional view of the three zones of an example conduit arrangement.

Referring to FIG. 13, a conduit arrangement, such as conduit arrangement 110, 210, 310, 410, 510, includes a first transition region T1 between the mixing zone Z1 and the impact zone Z2 and a second transition region T2 between the impact zone Z2 and the merge zone Z3. In certain examples, the first transition region T1 includes the entrance to the second flow path P2. In certain examples, the second transition region T2 includes the entrance to the third flow path P3.

Figure 14:
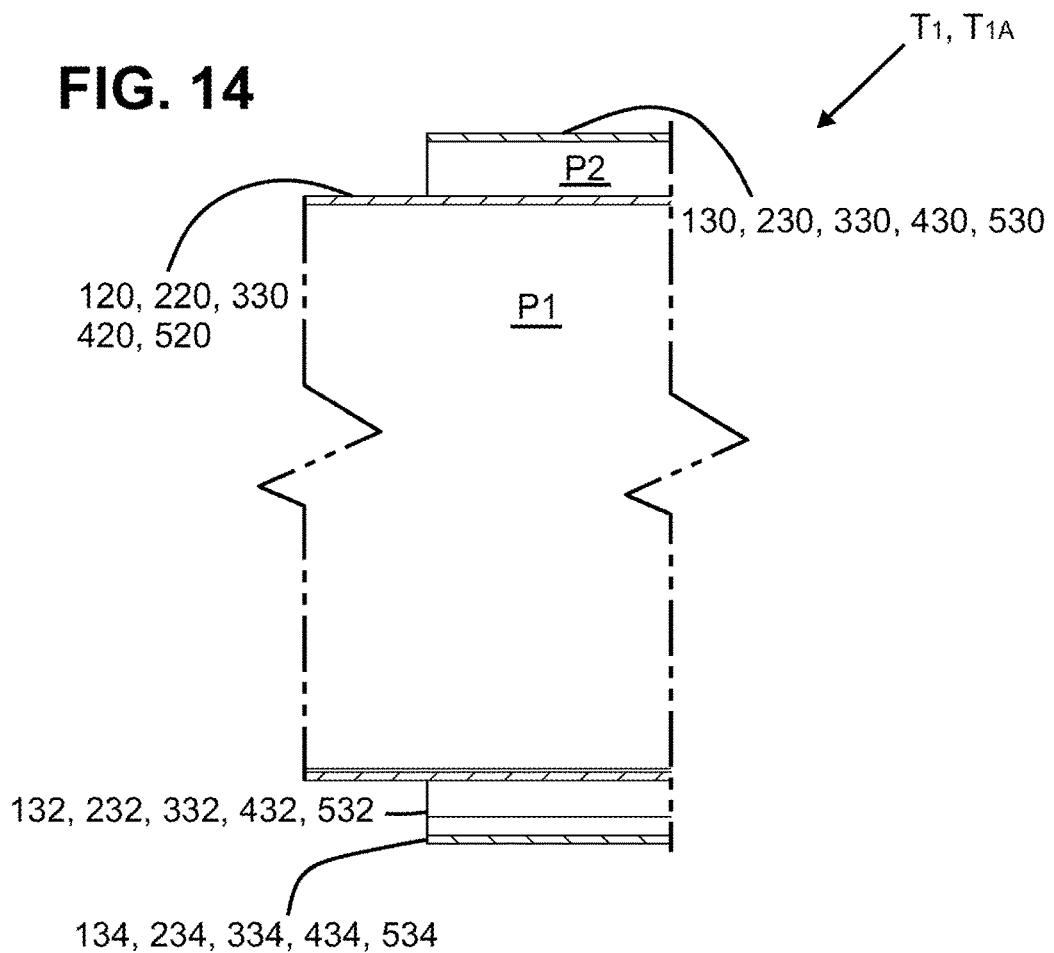
FIGS. 14-16 are longitudinal cross-sectional views showing example first transition regions between the mixing zone and the impact zone suitable for use with the conduit arrangement shown in FIG. 13.
Figure 15:
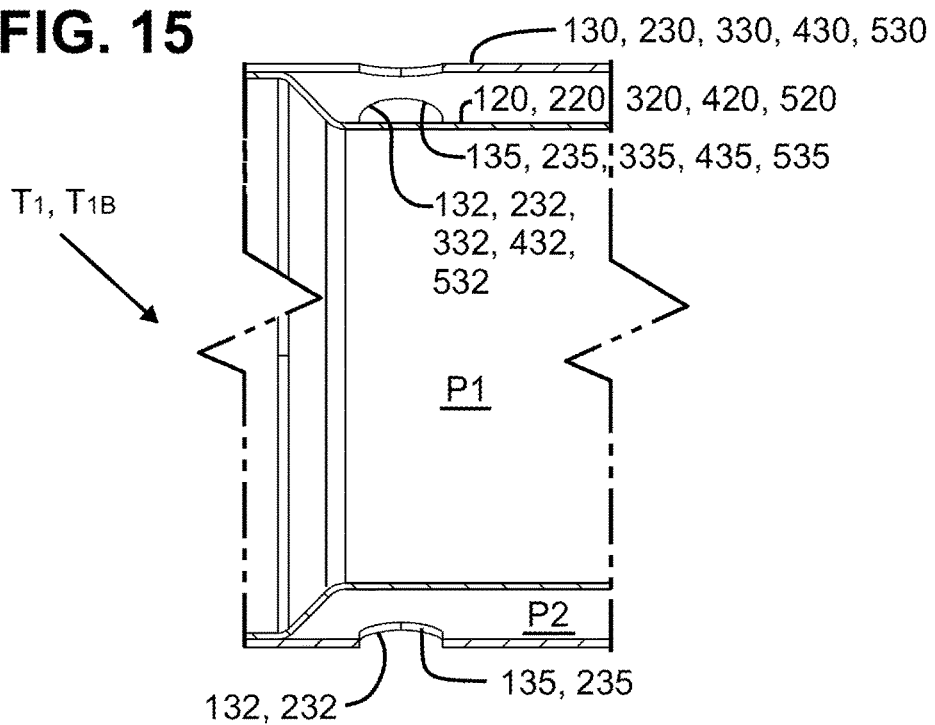
Figure 16:
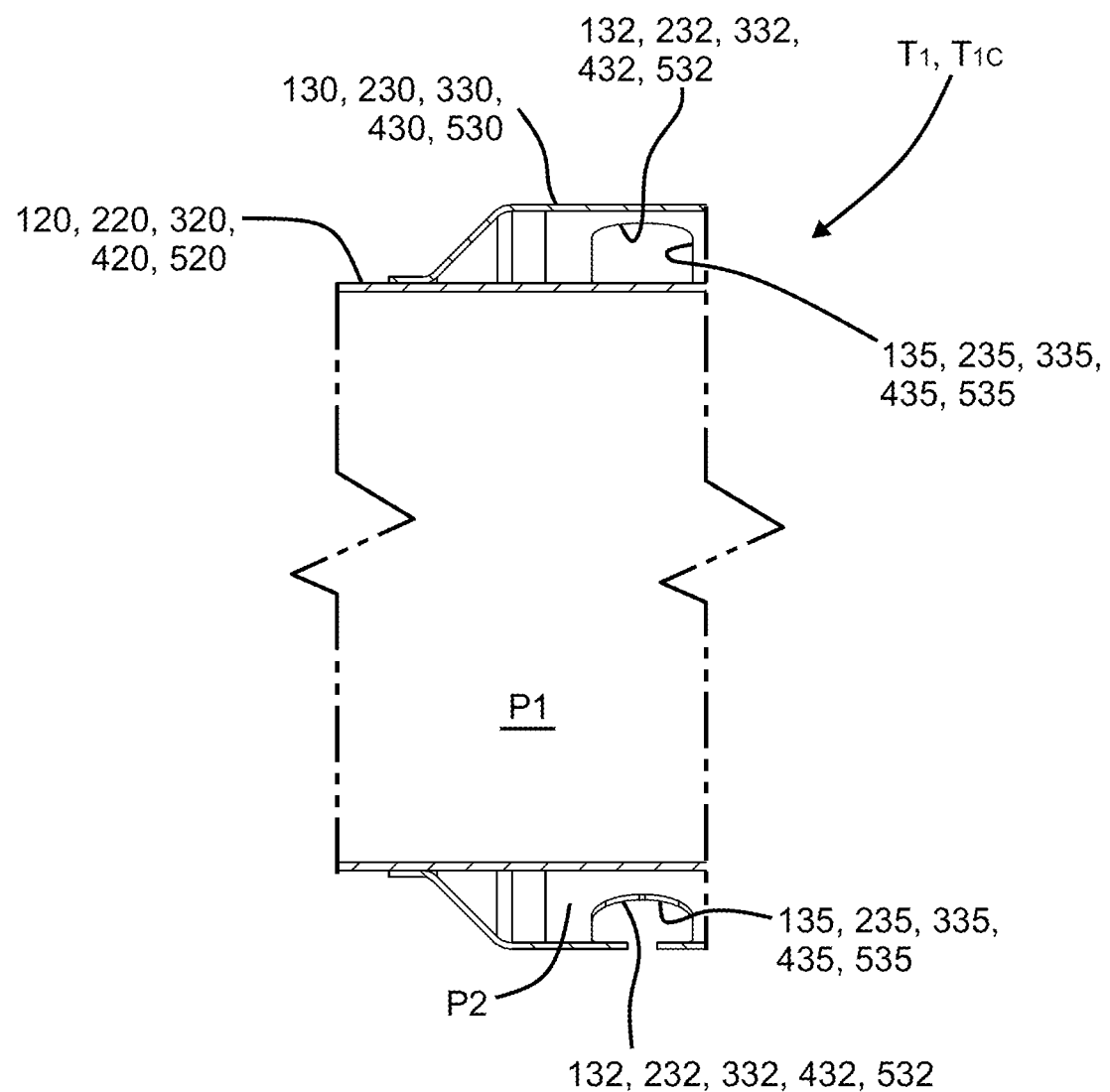

FIGS. 14-16 illustrate various example first transition regions T1 and FIGS. 17-20 illustrate various example second transition regions T2 suitable for use in any of the conduit arrangements 110, 210, 310, 410, 510 disclosed herein. FIG. 14 shows an example first transition region T1A in which the second entrance 132, 232, 332, 432, 532 to the second flow path P2 is defined by an open first axial end 134, 234, 334, 434, 534 of a second conduit 130, 230, 330, 430, 530 disposed around the first conduit 120, 220, 320, 420, 520. In some examples, the open first axial end 134, 234, 334, 434, 534 extends fully along a circumference of the first conduit 120, 220, 320, 420, 520. In other examples, the open first axial end 134, 234, 334, 434, 534 may extend partially along the circumference of the first conduit 120, 220, 320, 420, 520.

FIGS. 15 and 16 show other example first transition regions T1B, T1C in which the second entrance 132, 232, 332, 432, 532 to the second flow path P2 is downstream from the first axial end 134, 234, 334, 434, 534 of the second conduit 130, 230, 330, 430, 530. Instead, the second entrance 132, 232, 332, 432, 532 is defined by one or more apertures 135, 235, 335, 435, 535 defined in the second conduit 130, 230, 330, 430, 530 to allow exhaust to flow into the second flow path P2. In the first transition region T1B shown in FIG. 15, the first conduit 120, 220, 320, 420, 520 tapers radially inwardly away from the second conduit 130, 230, 330, 430, 530 to provide the space for the second flow path P2. In the second transition region T1C shown in FIG. 16, the second conduit 130, 230, 330, 430, 530 tapers radially outwardly away from the first conduit 120, 220, 320, 420, 520 to provide the space for the second flow path P2.

Figure 17:
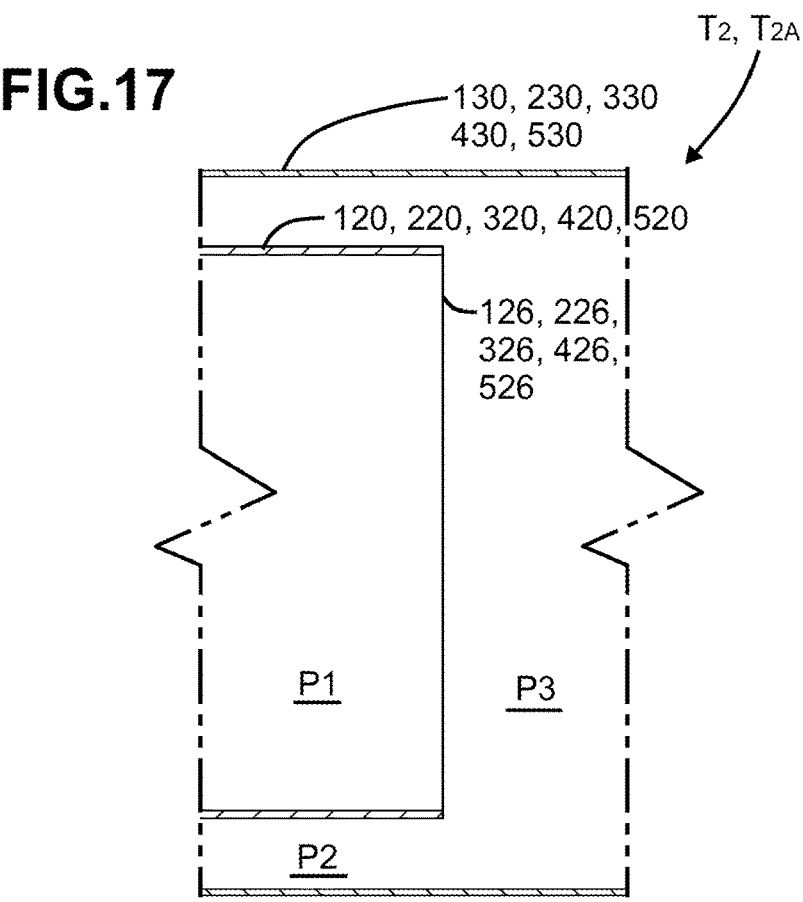

FIG. 17 shows an example second transition region T2A in which the third entrance to the third flow path P3 is defined by an open second axial end 126, 226, 326, 426, 526 of a first conduit 120, 220, 320, 420, 520 disposed within a second conduit 130, 230, 330, 430, 530. In such examples, the second conduit 130, 230, 330, 430, 530 defines the second flow path P2 around the first axial conduit 120, 220, 320, 420, 520 before reaching the open second axial end 126, 226, 326, 426, 526 of a first conduit 120, 220, 320, 420, 520 and defines the third flow path P3 extending beyond the open second axial end 126, 226, 326, 426, 526 of a first conduit 120, 220, 320, 420, 520.

Figure 18:
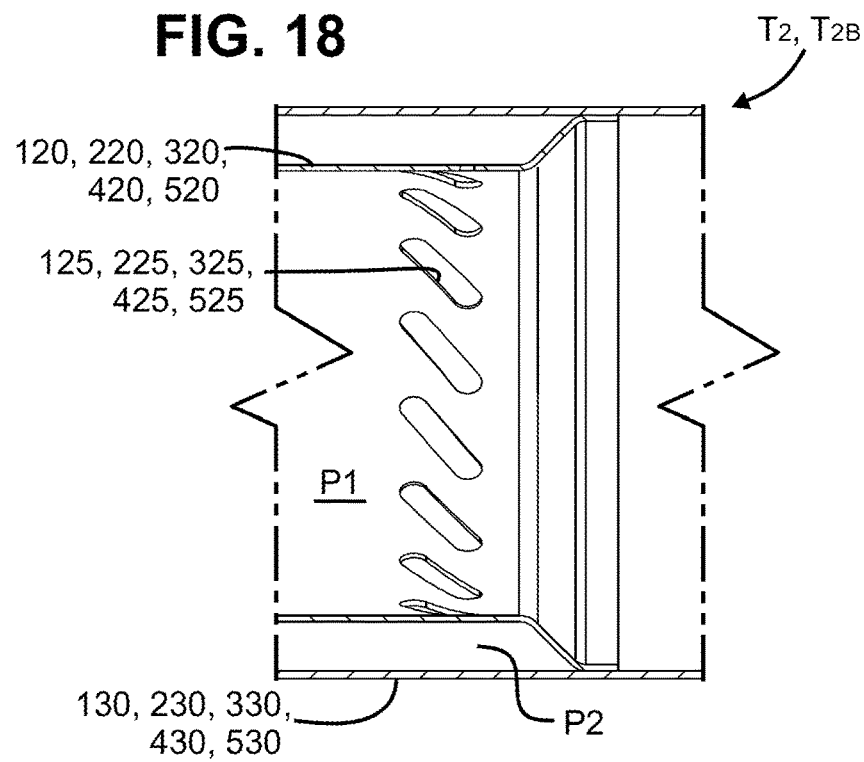

FIGS. 18-20 show other example second transition regions T2B, T2C, T2D in which the third entrance to the third flow path P3 is downstream from the second axial end 126, 226, 326, 426, 526 of the first conduit 120, 220, 320, 420, 520. Instead, the third entrance is defined by one or more apertures 125, 225, 325, 425, 525 defined in the first conduit 120, 220, 320, 420, 520 to allow exhaust to flow from the second flow path P2 into the first flow path P1.

In the second transition region T2B shown in FIG. 18, the second axial end 126, 226, 326, 426, 526 of the first conduit 120, 220, 320, 420, 520 tapers radially outward to the second conduit 130, 230, 330, 430, 530. In the example shown, the radial tapering occurs downstream of the apertures 125, 225, 325, 425, 525. In other examples, the apertures 125, 225, 325, 425, 525 can be provided along the radially tapering portion of the first conduit 120, 220, 320, 420, 520. Accordingly, the third flow path P3 is partially defined by the second end 126, 226, 326, 426, 526 of the first conduit 120, 220, 320, 420, 520. In the example shown, the second axial end 126, 226, 326, 426, 526 of the first conduit 120, 220, 320, 420, 520 terminates upstream of the second axial end 136, 236, 336, 436, 536 of the second conduit 130, 230, 330, 430, 530. Accordingly, the second conduit 130, 230, 330, 430, 530 defines another portion of the third flow path P3.

In the second transition region T2C shown in FIG. 19, the second axial end 126, 226, 326, 426, 526 of the first conduit 120 tapers radially outward to the second conduit 130, 230, 330, 430, 530 as it did in FIG. 18. The first conduit 120, 220, 320, 420, 520 also defines the apertures 125, 225, 325, 425, 525 upstream of the radial taper. Unlike in FIG. 18, however, the first conduit 120, 220, 320, 420, 520 continues extending beyond the radially tapered portion. Accordingly, the third flow path P3 in FIG. 19 is defined by the first conduit 120, 220, 320, 420, 520. In particular, the first conduit 120, 220, 320, 420, 520 defines the first flow path P1 upstream of the apertures 125, 225, 325, 425, 525 and defines the third flow path P3 downstream of the apertures 125, 225, 325, 425, 525.

In the second transition region T2D shown in FIG. 20, the second axial end 136, 236, 336, 436, 536 of the second conduit 130, 230, 330, 430, 540 taper radially inward to the first conduit 120, 220, 320, 420, 520, which extends beyond the second axial end 136, 236, 336, 436, 536 of the second conduit 130, 230, 330, 430, 530. The first conduit 120, 220, 320, 420, 520 defines the apertures 125, 225, 325, 425, 525 through which exhaust flows from the second flow path P2 to the third flow path P3. The first conduit 120, 220, 320, 420, 520 defines the first flow path P1 upstream of the apertures 125, 225, 325, 425, 525 and defines the third flow path P3 downstream of the apertures 125, 225, 325, 425, 525.

Referring to FIGS. 22-25, a third example dosing and mixing assembly 300 is shown. In the third dosing and mixing assembly 300, the first conduit 320 defines a spray path protection zone Z4 upstream of the mixer 328 (see FIG. 24). The protection flow zone Z4 is disposed at the doser mounting location 340 to facilitate flow of reactant from the doser 345 towards the impact zone Z2 without prematurely opening the spray path R of the reactant from the doser 345. Opening the spray path R too quickly can lead to deposits of the reactant upstream of the impact zone Z2, which can result in build-up of deposits and blockage of the exhaust flow within the system. For example, swirling exhaust flow around the reactant injection site can push reactant radially outwardly from the spray path R towards the inner surface of the first conduit 320, thereby leading to deposition of reactant on the louvers 329 of the mixer 328 or around the nozzle of the doser 345.

In certain implementations, the protection zone Z4 is defined by a perforated region 360 of the first conduit 320 disposed between the injector mounting location 340 and the mixer 328. The perforations at the perforated region 360 do not impart swirling onto exhaust entering the first conduit 320 through the perforations. In certain examples, the perforations mitigate any swirling that was imparted on the exhaust (e.g., from the exhaust moving around the exterior of the first conduit 320) prior to the exhaust entering through the perforations. In certain examples, the perforations mitigate any large scale turbulence that was imparted on the exhaust prior to the exhaust passing through the perforations.

In certain implementations, the perforations of the perforated region 360 are sized to inhibit swirling and/or other turbulence of the exhaust passing through the perforations. In certain examples, each perforation has a cross-dimension (e.g., a diameter) of less than about 5 mm. In certain examples, each perforation has a cross-dimension of less than about 4 mm. In certain examples, each perforation has a cross-dimension of about 3 mm. In certain examples, each perforation has a cross-dimension of less than about 3 mm. In certain examples, each perforation has a cross-dimension of between 2 and 4 mm. In certain examples, each perforation has a cross-dimension of between 2.5 and 3.5 mm.

Figure 23:
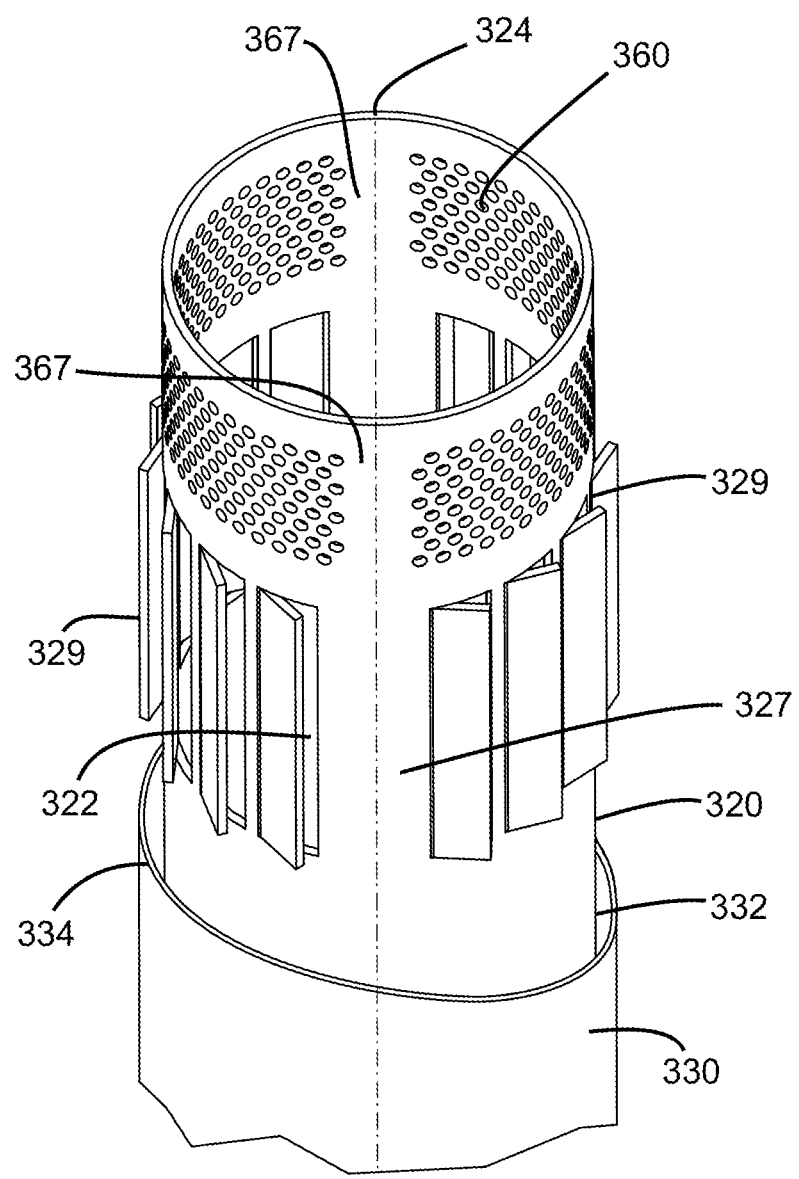
FIG. 23 is a perspective view of a portion of an example conduit arrangement including first and second conduits suitable for use in the third dosing and mixing assembly of FIG. 22, the first conduit defining a mixing zone and a spray protection zone.

As shown in FIG. 23, the perforations of the perforated region 360 extend over at least a majority of the circumference of the first conduit 320. In certain examples, the perforations may extend over a full circumference of the first conduit 320. In other examples, the perforations extend over less than a majority of the circumference of the first conduit 320. In certain implementations, the perforated region 360 includes one or more non-perforated sections 367 (i.e., a circumferential section of the first conduit 320 in which the adjacent perforations bounding the section are circumferentially spaced further from each other compared to the remainder of the adjacent perforations of the perforated region 360). In certain examples, the perforations of the perforated region 360 are divided into two groups separated by oppositely disposed non-perforated sections 367. The inclusion of oppositely disposed non-perforated sections 367 results in symmetrical flow through the protection zone Z4. In certain examples, the non-perforated sections 367 align with the non-louvered sections 327 of the mixer 328.

In certain implementations, a mixer 328 and the perforated region 360 have a combined length that is less than a cross-dimension of the inlet 302. In certain examples, the housing 312 provides flow access to an exterior of the first conduit 320 over an area that is larger than just the mixer 328 and the perforated region 360. In certain examples, the exhaust flow from the inlet 302 is not divided before passing through one of the mixer 328, the perforated region 360, and the bypass channel P2. In certain examples, the dosing and mixing assembly 300 does not include any guide or baffle structure at an exterior of the first conduit 320 in alignment with the inlet 302 other than the louvers 329.

At least some of the exhaust flow from the inlet 302 enters the first conduit 320 through the perforated region 360 instead of through the mixer 328. In certain implementations, less flow enters through the perforated region 360 than through the mixer 328. In certain implementations, at least 15% of the exhaust from the inlet 302 flows into the first conduit 320 through the perforated region 360. In certain implementations, at least 20% of the exhaust from the inlet 302 flows into the first conduit 320 through the perforated region 360. In certain implementations, at least 25% of the exhaust from the inlet 302 flows into the first conduit 320 through the perforated region 360. In certain implementations, at least 30% of the exhaust from the inlet 302 flows into the first conduit 320 through the perforated region 360. In certain implementations, at least 35% of the exhaust from the inlet 302 flows into the first conduit 320 through the perforated region 360. In certain implementations, between about 20% and 45% of the exhaust from the inlet 302 flows into the first conduit 320 through the perforated region 360. In certain implementations, between about 25% and 40% of the exhaust from the inlet 302 flows into the first conduit 320 through the perforated region 360. In certain implementations, between about 30% and 35% of the exhaust from the inlet 302 flows into the first conduit 320 through the perforated region 360.

In certain implementations, no more than 80% of the exhaust from the inlet 302 flows into the first conduit 320 through the mixer 328. In certain implementations, no more than 75% of the exhaust from the inlet 302 flows into the first conduit 320 through the mixer 328. In certain implementations, no more than 70% of the exhaust from the inlet 302 flows into the first conduit 320 through the mixer 328. In certain implementations, no more than 65% of the exhaust from the inlet 302 flows into the first conduit 320 through the mixer 328. In certain implementations, no more than 60% of the exhaust from the inlet 302 flows into the first conduit 320 through the mixer 328. In certain implementations, no more than 55% of the exhaust from the inlet 302 flows into the first conduit 320 through the mixer 328. In certain implementations, between about 45% and 70% of the exhaust from the inlet 302 flows into the first conduit 320 through the perforated region 360. In certain implementations, between about 55% and 65% of the exhaust from the inlet 302 flows into the first conduit 320 through the perforated region 360.

Figure 24:
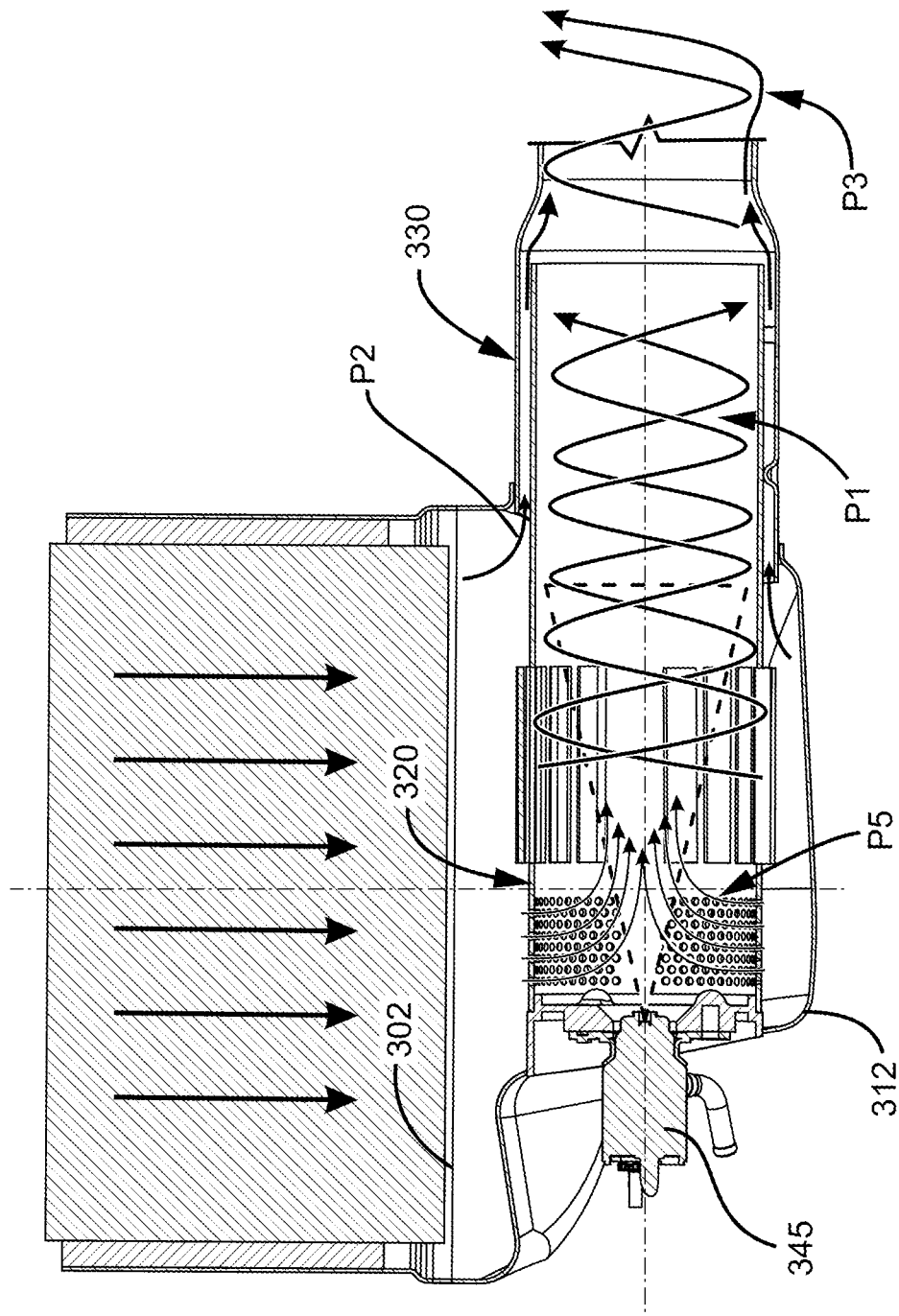
FIG. 24 shows exhaust flow through the third dosing and mixing assembly of FIG. 22.
Figure 25:
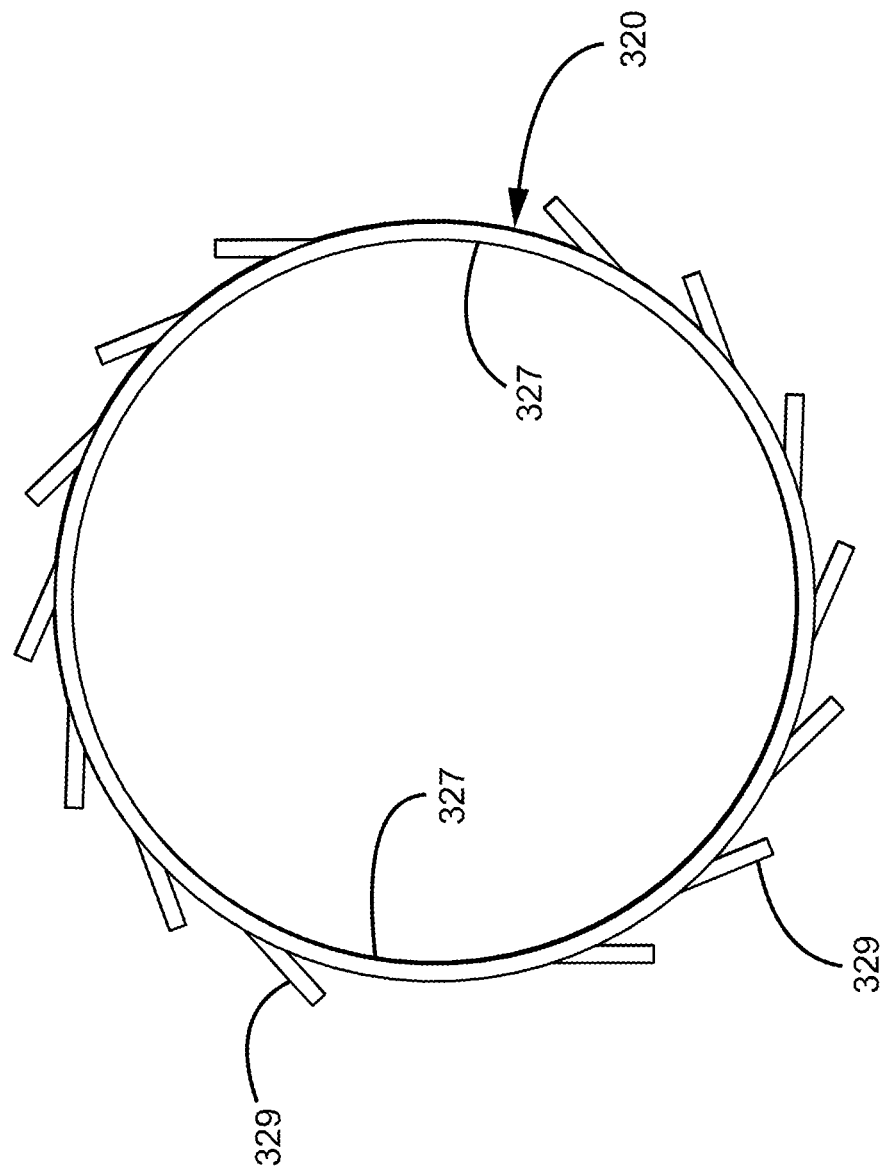
FIG. 25 is an axial end view of the first conduit of FIG. 23.

The exhaust flow entering through the perforated region 360 (see flow path P5) carries the reactant towards the mixer 328 with minimal effect on the spray path R (e.g., see FIG. 24). The flow entering the first conduit 320 through the mixer 328 initially swirls around the low or non-swirling flow from the perforated region 360. The flow from the mixer 328 mixes with the exhaust flow from the perforated region 360 as the flows progress downstream through the first conduit 320, thereby creating a swirling flow of exhaust and reactant within the first conduit 320 downstream of the mixer 328.

The second conduit 330 includes a generally tubular body extending between the first and second axial ends 334, 336. In the example shown, the tubular body has a generally constant cross-dimension. In certain examples, the first end 334 of the second conduit 330 is mounted to the housing 312. In certain implementations, the second end 336 of the second conduit 330 is mounted to a third conduit 350. For example, the third conduit 350 can be secured to the second conduit 330 using a clamp C or other fastener.

A third entrance to the third flow path P3 is defined at the merge zone Z3. The second axial end 326 of the first conduit 320 extends past the second axial end 336 of the second conduit 330 and into the third conduit 350. Accordingly, the third entrance is defined at the second axial end 326 of the first conduit 320. The second portion of the exhaust flowing through the second flow path P2 merges with the first portion of the exhaust flowing through the first flow path P1 when the second portion passes the second axial end 326 of the first conduit 320. Accordingly, the third conduit 350 that defines the merge zone Z3.

In certain examples, the third conduit 350 is mounted to the second conduit 330 at a coupling location that is radially aligned with the first conduit 320. In certain examples, the coupling location is radially aligned with the impact zone Z2 of the first conduit 320. In certain implementations, insulation is reduced or absent at the location of the clamp C. However, the heated exhaust traveling through the second flow path P2 insulates the impact zone Z2 from the external environment at the coupling location. For example, the heated exhaust in the second flow path P2 flows between the clamp C or other fastener—which may otherwise dissipate heat at the coupling location—and the first conduit 320 at the impact zone Z2.

Figure 26:
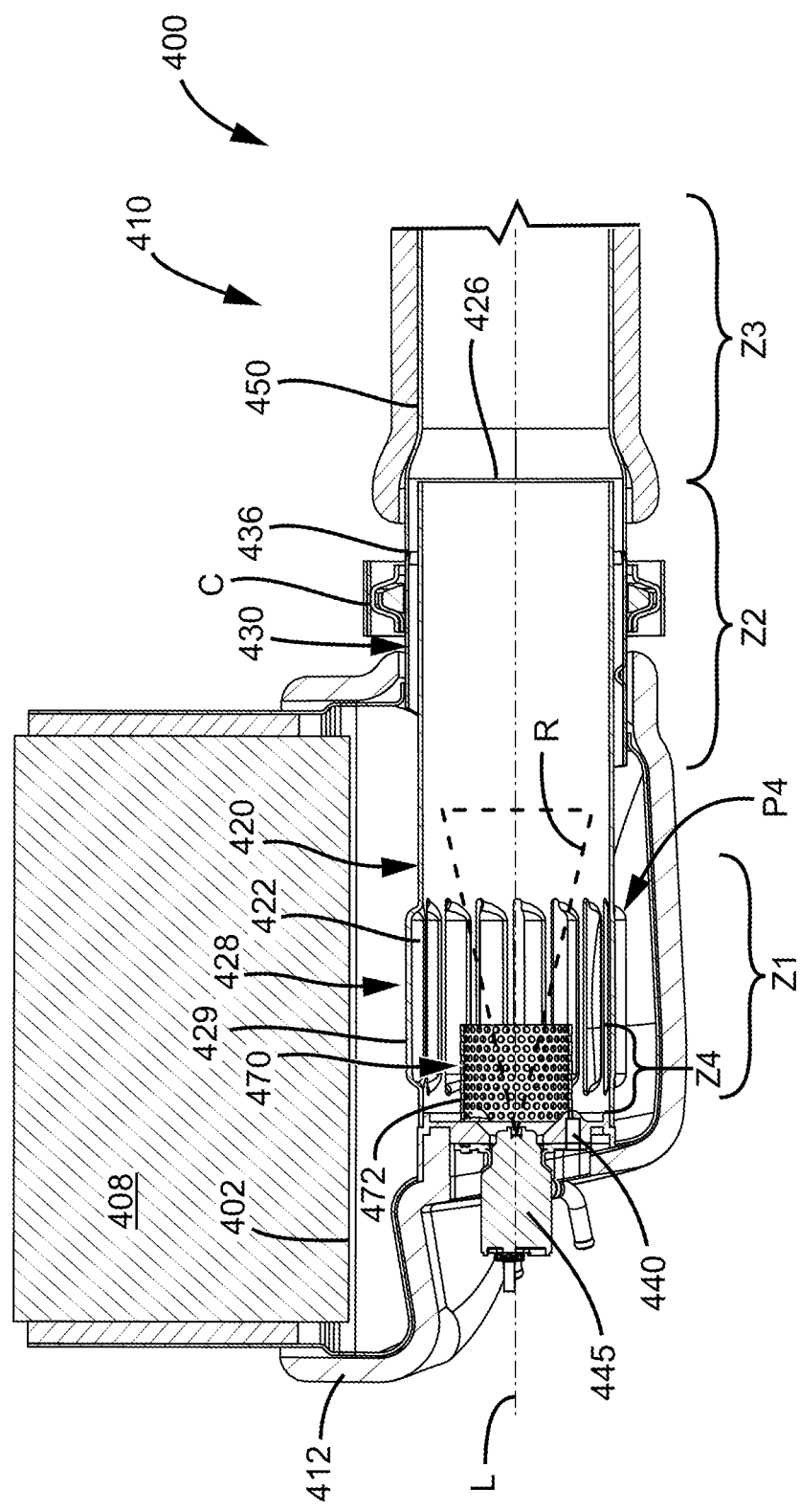
FIG. 26 is a longitudinal cross-sectional view of a fourth example dosing and mixing assembly including a conduit arrangement defining a spray path protection zone, mixing zone, an impact zone, and a merge zone in accordance with the principles of the present disclosure.

Referring to FIG. 26, a fourth example dosing and mixing assembly 400 is shown. In the fourth dosing and mixing assembly 400, a spray protector 470 is disposed within the first conduit 420 at the injector mounting location 440. The spray protector 470 is positioned to surround a nozzle of the doser 445 disposed at the doser mounting location 440. The spray protector 470 inhibits flow entering the first conduit 420 through the mixer 428 from opening the spray path R of the reactant too quickly. In certain examples, the spray protector 470 blocks at least some of the swirling flow from reaching the nozzle of the doser 445. In certain examples, the spray protector 470 reduces swirling and/or other large-scale turbulence in exhaust flow that reaches the nozzle of the doser 445.

In certain implementations, the spray protector 470 includes a perforated conduit 472. The perforations of the spray protector 470 are sized to mitigate turbulence of exhaust passing through the perforations. In certain examples, each perforation has a cross-dimension (e.g., a diameter) of less than about 5 mm. In certain examples, each perforation has a cross-dimension of less than about 4 mm. In certain examples, each perforation has a cross-dimension of about 3 mm. In certain examples, each perforation has a cross-dimension of less than about 3 mm. In certain examples, each perforation has a cross-dimension of between 2 and 4 mm. In certain examples, each perforation has a cross-dimension of between 2.5 and 3.5 mm.

In some implementations, the perforated conduit 472 is cylindrical. In other implementations, the perforated conduit 472 can have other shapes. In certain implementations, the perforations of the spray protector 470 extend over at least a majority of a circumference of the perforated conduit 472. In certain examples, the perforations extend over the full circumference. In other examples, the perforated conduit 472 may define one or more non-perforated circumferential sections. In certain examples, the perforated conduit 472 defines two oppositely disposed non-perforated circumferential sections. In an example, a non-perforated circumferential section faces towards the inlet 402.

In some implementations, the perforated conduit 472 is mounted to a doser mount that also holds the doser 445 at the doser mounting location 440. In other implementations, the perforated conduit 472 is mounted to the first conduit 420. In certain implementations, the perforated conduit 472 extends from the doser towards the impact zone Z2 of the first conduit 420. In certain examples, the perforated conduit 472 extends partially across the mixer 428. In certain examples, the perforated conduit 472 extends across less than a majority of an axial length of the mixer 428. In certain examples, the perforated conduit 472 extends across between 25% and 50% of the mixer 428.

The second conduit 430 includes a generally tubular body extending between the first and second axial ends 434, 436. In the example shown, the tubular body has a generally constant cross-dimension. In certain examples, the first end 434 of the second conduit 430 is mounted to the housing 412. In certain implementations, the second end 436 of the second conduit 430 is mounted to a third conduit 450. For example, the third conduit 450 can be secured to the second conduit 430 using a clamp C or other fastener.

A third entrance to the third flow path P3 is defined at the merge zone Z3. The second axial end 426 of the first conduit 420 extends past the second axial end 436 of the second conduit 430 and into the third conduit 450. Accordingly, the third entrance is defined at the second axial end 426 of the first conduit 420. The second portion of the exhaust flowing through the second flow path P2 merges with the first portion of the exhaust flowing through the first flow path P1 when the second portion passes the second axial end 426 of the first conduit 420. Accordingly, the third conduit 450 that defines the merge zone Z3.

In certain examples, the third conduit 450 is mounted to the second conduit 430 at a coupling location that is radially aligned with the first conduit 420. In certain examples, the coupling location is radially aligned with the impact zone Z2 of the first conduit 420. In certain implementations, insulation is reduced or absent at the location of the clamp C. However, the heated exhaust traveling through the second flow path P2 insulates the impact zone Z2 from the external environment at the coupling location. For example, the heated exhaust in the second flow path P2 flows between the clamp C or other fastener—which may otherwise dissipate heat at the coupling location—and the first conduit 420 at the impact zone Z2.

Figure 27:
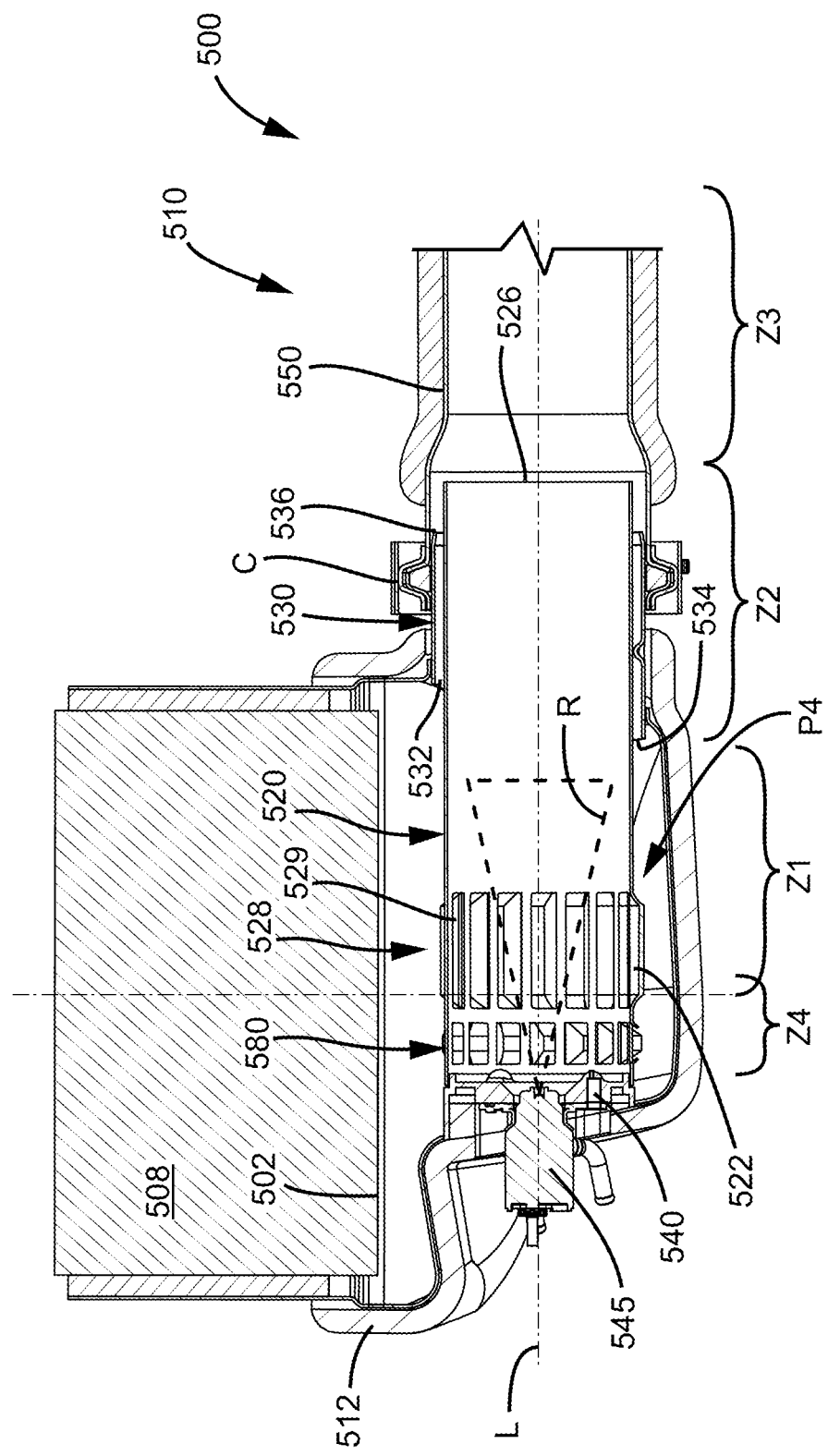
FIG. 27 is a longitudinal cross-sectional view of a fifth example dosing and mixing assembly including a conduit arrangement defining a spray path protection zone, mixing zone, an impact zone, and a merge zone in accordance with the principles of the present disclosure.

Referring to FIGS. 27 and 28, a fifth example dosing and mixing assembly 500 is shown. In the fifth dosing and mixing assembly 500, the first conduit 520 defines a spray path protection zone Z4 upstream of the mixer 528 (see FIG. 27). The protection flow zone Z4 is disposed between the mixer 528 and the doser mounting location 540 to facilitate flow of reactant from the doser 545 towards the impact zone Z2 without prematurely opening the spray path R of the reactant from the doser 545. Opening the spray path R too quickly can lead to deposits of the reactant upstream of the impact zone Z2, which can result in build-up of deposits and blockage of the exhaust flow within the system. For example, swirling exhaust flow around the reactant injection site can push reactant radially outwardly from the spray path R towards the inner surface of the first conduit 520, thereby leading to deposition of reactant on the louvers 529 of the mixer 528 or around the nozzle of the doser 545.

In certain implementations, the protection zone Z4 is defined by a louvered section 580 located upstream from the mixer 528. The louvered section 580 is configured to impart swirl in an opposite direction than the mixer 528. A first part of the exhaust flow from the inlet 502 will enter the first conduit 520 through the louvered section 580 while a second part of the exhaust flow from the inlet 502 will enter the first conduit 520 through the mixer 528. The louvered section 580 will impart swirling in a first direction to the first part of the exhaust while the mixer 528 will impart swirling in a second direction to the second part of the exhaust. The interaction between these two swirling flows at the upstream end of the mixer 528 initially inhibits the swirling imparted by the mixer 528, thereby reducing the effect the mixer 528 has on the spray path R of the reactant dispensed from the doser 545.

In certain implementations, the louvers 584 of the louvered section 580 are smaller (e.g., shorter along the conduit axis L) compared to the louvers 529 of the mixer 528. Accordingly, less flow enters through the louvered section 580 than through the mixer 528. In certain implementations, the axial length (along the conduit axis L) of the louvers 584 is less than half of the axial length of the mixer louvers 529. In certain implementations, the axial length of the louvers 584 is between 10% and 40% of the axial length of the mixer louvers 529. In certain implementations, the axial length of the louvers 584 is between 10% and 25% of the axial length of the mixer louvers 529. In certain implementations, the axial length of the louvers 584 is between 15% and 20% of the axial length of the mixer louvers 529. In certain implementations, the total open area provided by the louvered section 580 is between about 15% and 55% of the total open area provided by the mixer 528. In certain examples, the total open area provided by the louvered section 580 is between about 25% and 45% of the total open area provided by the mixer 528.

The second conduit 530 includes a generally tubular body extending between the first and second axial ends 534, 536. In the example shown, the tubular body has a generally constant cross-dimension. In certain examples, the first end 534 of the second conduit 530 is mounted to the housing 512. In certain implementations, the second end 536 of the second conduit 530 is mounted to a third conduit 550. For example, the third conduit 550 can be secured to the second conduit 530 using a clamp C or other fastener.

A third entrance to the third flow path P3 is defined at the merge zone Z3. The second axial end 526 of the first conduit 520 extends past the second axial end 536 of the second conduit 530 and into the third conduit 550. Accordingly, the third entrance is defined at the second axial end 526 of the first conduit 520. The second portion of the exhaust flowing through the second flow path P2 merges with the first portion of the exhaust flowing through the first flow path P1 when the second portion passes the second axial end 526 of the first conduit 520. Accordingly, the third conduit 550 that defines the merge zone Z3.

In certain examples, the third conduit 550 is mounted to the second conduit 530 at a coupling location that is radially aligned with the first conduit 520. In certain examples, the coupling location is radially aligned with the impact zone Z2 of the first conduit 520. In certain implementations, insulation is reduced or absent at the location of the clamp C. However, the heated exhaust traveling through the second flow path P2 insulates the impact zone Z2 from the external environment at the coupling location. For example, the heated exhaust in the second flow path P2 flows between the clamp C or other fastener—which may otherwise dissipate heat at the coupling location—and the first conduit 520 at the impact zone Z2.

Specific combinations of features that represent embodiments of the invention disclosed herein, are described by the following numbered clauses:

1. A conduit arrangement (110, 210, 310, 410, 510) for use in an exhaust aftertreatment assembly, the conduit arrangement extending along a conduit axis and comprising:
    a first flow path (P1) extending along the conduit axis (L) of the conduit arrangement (110, 210, 310, 410, 510), the first flow path (P1) having a first entrance (122, 222, 322, 422, 522);
    a second flow path (P2) at least partially surrounding the first flow path (P1), the second flow path (P2) having a second entrance (132, 232, 332, 432, 532) that is located downstream from the first entrance (122, 222, 322, 422, 522), the second flow path (P2) having a cross-sectional area that is smaller than a cross-sectional area of the first flow path (P1);
    a common flow (P3) path being fed from both the first flow path (P1) and the second flow path (P2);
    a mixing zone (Z1) at which turbulence is applied to exhaust flowing through the first flow path (P1) such that the turbulence within the first flow path (P1) is greater than any turbulence within the second flow path (P2);
    an impact zone (Z2) downstream of the mixing zone and upstream of the common flow path (P3), the impact zone (Z2) defined within the first flow path (P1);
    a merge zone (Z3) at which the first and second flow paths (P1, P2) combine to form the common flow path (P3), the merge zone (Z3) being downstream of the impact zone (Z2); and
    a doser mounting location (140, 240, 340, 440, 540) configured to receive a reactant injector (145, 245, 345, 445, 545), the doser mounting location (140, 240, 340, 440, 540) being oriented to face into the first flow path (P1) at or upstream of the mixing zone (Z1).
2. The conduit arrangement (110, 210, 310, 410, 510) of clause 1, further comprising a first conduit (120, 220, 320, 420, 520) extending between first and second axial ends (124, 126; 224, 226; 324, 326; 424, 426; 524, 526) and defining a through-passage, the through-passage forming the first flow path (P1), the first conduit (120, 220, 320, 420, 520) defining the mixing zone (Z1) and the impact zone (Z2), the first conduit (120, 220, 320, 420, 520) including tangential velocity imparting members disposed at the mixing zone (Z2).
3. The conduit arrangement (110, 210) of clause 2, wherein the doser mounting location (140, 240, 340, 440, 540) is disposed at the first axial (124, 224, 324, 424, 524) end of the first conduit (120, 220, 320, 420, 520) and is oriented to face along the conduit axis (L) of the conduit arrangement (110, 210, 310, 410, 510).
4. The conduit arrangement (110, 210, 310, 410, 510) of any of clauses 2-3, wherein the tangential velocity imparting members include louvered apertures (129, 229, 329, 429, 529).
5. The conduit arrangement (110, 210, 310, 410, 510) of any of clauses 2-4, further comprising a second conduit (130, 230, 330, 430, 530) disposed at least partially around the first conduit (120, 220, 320, 420, 520) to define the second flow path (P2) therebetween, the second conduit (130, 230, 310, 430, 530) extending between respective first and second axial ends (134, 234; 136, 236), the first axial end (134, 234, 334, 434, 534) of the second conduit (130, 230, 330, 430, 530) being offset downstream from the first axial end (124, 224, 324, 424, 524) of the first conduit (120, 220, 320, 420, 520).
6. The conduit arrangement (110, 210, 310, 410, 510) of clause 5, wherein the second conduit (130, 230, 330, 430, 530) defines a constant cross-dimension around the impact zone (Z2).
7. The conduit arrangement (110, 210, 310, 410, 510) of clause 5, wherein the second conduit (130, 230, 330, 430, 530) defines a profiled surface around the impact zone (Z2).
8. The conduit arrangement (110, 210, 310, 410, 510) of any of clauses 5-7, wherein the first axial end (134, 234) of the second conduit (130, 230, 330, 430, 530) is open to define the second entrance (132, 232) to the second flow path (P2).
9. The conduit arrangement (110, 210, 310, 410, 510) of any of clauses 5-7, wherein the second conduit (130, 230, 330, 430, 530) defines one or more apertures (135, 235, 335, 435, 535) downstream of the first axial end (134, 234, 334, 434, 534) of the second conduit (130, 230, 330, 430, 530), the one or more apertures (135, 235) of the second conduit (130, 230, 330, 430, 530) defining the second entrance (132, 232, 332, 432, 532) to the second flow path (P2).
10. The conduit arrangement (110, 210, 310, 410, 510) of clause 9, wherein the second conduit (130, 230, 330, 430, 530) extends radially outward away from the first conduit (120, 220, 320, 420, 520) at the first axial end (134, 234, 334, 434, 534) of the second conduit (130, 230, 330, 430, 530).
11. The conduit arrangement (110, 210, 310, 410, 510) of clause 9, wherein the first conduit (120, 220, 320, 420, 520) extends radially inward away from the second conduit (130, 230, 330, 430, 530) at the first axial end (134, 234) of the second conduit (130, 230, 330, 430, 530).
12. The conduit arrangement (110, 310, 410, 510) of any of clauses 5-11, wherein the second axial end (126, 326, 426, 526) of the first conduit (120, 320, 420, 520) does not contact the second conduit (130, 330, 430, 530) at the merge zone (Z3).
13. The conduit arrangement (210) of any of clauses 5-11, wherein the first conduit (220) defines one or more apertures (225) that define an entrance to the common flow path (P3) at the merge zone (Z3).
14. The conduit arrangement (210) of clause 13, wherein the first conduit (220) tapers radially outward to contact the second conduit (230) at or upstream of the one or more apertures (225) of the first conduit.
15. The conduit arrangement (210) of clause 13, wherein the second conduit (230) tapers radially inward to contact the first conduit (220) at or upstream of the one or more apertures (225) of the first conduit (220).
16. The conduit arrangement (110, 210, 310, 410, 510) of any of clauses 13-15, wherein the common flow path (P3) is defined by the first conduit (120, 220).
17. The conduit arrangement (110, 210, 310, 410, 510) of any of clauses 13-15, wherein the common flow path (P3) is defined by the second conduit (130, 230).
18. The conduit arrangement (110, 210, 310, 410, 510) of any of clauses 13-15, wherein the common flow path (P3) is defined by a third conduit (150, 350, 450, 550) coupled to either of the first and second conduits (120; 230, 310, 410, 510).
19. The conduit arrangement (210) of any of clauses 13-18, wherein the one or more apertures (225) of the first conduit (220) are elongate along slot axes (S), and wherein the one or more apertures (225) of the first conduit (220) are oriented so that the slot axes (S) are angled between 5 degrees and 85 degrees relative to the conduit axis (L) of the conduit arrangement (210).
20. The conduit arrangement of clause 19, wherein the one or more apertures (225) of the first conduit (220) are oriented and spaced so that the one or more apertures (225) of the first conduit overlap when viewed along a reference axis (N) extending perpendicular to any of the slot axes (S).
21. The conduit arrangement of clauses 13-20, wherein the one or more apertures (225) of the first conduit (220) are disposed in a ring extending around a circumference of the first conduit (220).
22. The conduit arrangement of any of clauses 1-21, further comprising a spray protection (Z4) at the doser mounting location (140, 240, 340, 440, 540) that inhibits swirling exhaust flow at the doser mounting location.
23. The conduit arrangement of clause 22, wherein the spray protection zone (Z4) is defined by a perforated conduit.
24. The conduit arrangement of clause 23, wherein the perforated conduit is fully disposed upstream of the mixing zone (Z1).
25. The conduit arrangement of clause 23, wherein the perforated conduit overlaps the mixing zone (Z1).
26. The conduit arrangement of clause 22, wherein the spray protection zone (Z4) is defined by a ring of louvers upstream of the mixing zone (Z1).
27. A mixing assembly (100, 200, 300, 400, 500) for use in an exhaust aftertreatment assembly, the mixing assembly (100, 200, 300, 400, 500) comprising:
 a first conduit (120, 220, 320, 420, 520) extending along a conduit axis (L) from a first axial end (124, 224, 324, 424, 524) to a second axial end (126, 226, 326, 426, 526) to form a main flow path, the first conduit (120, 220, 320, 420, 520) defining a bypass exit at the second axial end (126, 226, 326, 426, 526), the first conduit (120, 220, 320, 420, 520) also defining an impact region (P2) disposed between the first axial end (124, 224, 324, 424, 524) and the bypass exit, the first conduit (120, 220, 320, 420, 520) defining a continuous surface at the impact region (P2);
 a swirl mixer (128, 228, 328, 428, 528) disposed at the first end (124, 224, 324, 424, 524) of the first conduit (120, 220, 320, 420, 520), the swirl mixer (128, 228, 328, 428, 528) being configured to induce swirling of exhaust flowing through the first conduit (120, 220, 320, 420, 520);
 a doser mounting location (140, 240, 340, 440, 540) at the first axial end (124, 224, 324, 424, 524) of the first conduit (120, 220, 320, 420, 520), the doser mounting location (140, 240, 340, 440, 540) being positioned to orient a doser (145, 245) mounted thereto to dispense a reactant along a spray path (R) intersecting the impact region (P2) of the first conduit (120, 220, 320, 420, 520); and
 a second conduit (130, 230) surrounding at least a segment of the first conduit (120, 220, 320, 420, 520) to form a bypass flow path between the first and second conduits (120, 220, 320, 420, 520; 130, 230, 330, 430, 530), the second conduit (130, 230, 330, 430, 530) being coaxial with the first conduit (120, 220, 320, 420, 520), the second conduit (130, 230, 330, 430, 530) having a first axial (134, 234, 334, 434, 534) end located downstream of the first axial end (124, 224, 324, 424, 524) of the first conduit (120, 220, 320, 420, 520) to form a bypass entrance downstream of the swirl mixer (128, 228, 328, 428, 528),
 wherein the bypass exit provides fluid communication between the bypass flow path and the main flow path to allow exhaust flowing through the bypass flow path to rejoin with exhaust flowing through the main flow path.
28. The mixing assembly (100, 200, 300, 400, 500) of clause 27, wherein the swirl mixer (128, 228, 328, 428, 528) includes a louvered section (129, 229, 329, 429, 529) of the first conduit (120, 220, 320, 420, 520).
29. The mixing assembly (100, 200, 300, 400, 500) of any of clauses 27 and 28, wherein the second conduit (130, 230, 330, 430, 530) has a profiled shape.
30. The mixing assembly (100, 200) of any of clauses 27-29, wherein the bypass exit includes a plurality of apertures (225) disposed circumferentially around the first conduit (120, 220).
31. The mixing assembly (100, 200) of clause 30, wherein each of the apertures (225) is elongated along a slot axis that is non-orthogonally angled relative to the conduit axis.
32. The mixing assembly (100, 200) of clause 31, wherein one of the apertures (225) overlaps an adjacent aperture (225) when viewed along a reference axis normal to the slot axis of the one of the apertures (225).
33. The mixing assembly (100, 200, 300, 400, 500) of any of clauses 27-29, wherein the bypass exit is defined by the second axial end (126, 226, 326, 426, 526) of the first conduit (120, 220, 320, 420, 520) terminating downstream of a second axial end (136, 236, 336, 436, 536) of the second conduit (130, 230, 330, 430, 530).
34. The mixing assembly (100, 200, 300, 400, 500) of any of clauses 27-33, wherein the bypass entrance is defined through one or more apertures defined in the second conduit (130, 230, 330, 430, 530).
35. The mixing assembly (100, 200, 300, 400, 500) of any of clauses 27-33, wherein the bypass entrance is defined by a radial gap between the first conduit (120, 220, 320, 420, 520) and the first axial end (134, 234) of the second conduit (130, 230, 330, 430, 530).
36. The mixing assembly (100, 200, 300, 400, 500) of any of clauses 27-35, further comprising a spray path protector (360, 470, 580) at the first end (324, 424, 524) of the first conduit (320, 420, 520).
37. The mixing assembly (100, 200, 300, 400, 500) of clause 36, wherein the spray path protector includes a perforated section (360) of the first conduit (320) upstream of the swirl mixer (328).
38. The mixing assembly (100, 200, 300, 400, 500) of clause 36, wherein the spray path protector includes a perforated conduit (470) disposed within the first conduit (420).
39. The mixing assembly (100, 200, 300, 400, 500) of clause 38, wherein the perforated conduit (470) partially overlaps the swirl mixer (428).
40. The mixing assembly (100, 200, 300, 400, 500) of clause 36, wherein the spray path protector includes a louvered section (580) disposed upstream of the swirl mixer (528), the louvered section (580) including louvers (584) that are shorter than louvers (529) of the swirl mixer (528).
41. A method of treating exhaust comprising:
directing exhaust along a conduit axis (L) of a conduit arrangement (110, 210, 310, 410, 510);
guiding a first portion of the exhaust through an entrance (122, 222, 322, 422, 522) to a first flow path (P1) of the conduit arrangement (110, 210, 310, 410, 510);
inducing swirling of the first portion of the exhaust at a mixing zone (Z1) of the first flow path (P1);
injecting reactant into the first portion of the exhaust traveling along a conduit (120, 220, 320, 420, 520) that defines at least an impact zone (Z2) of the first flow path (P1), the impact zone (Z2) being downstream from the mixing zone (Z1), the reactant being injected along a spray path (R) that intersects the conduit (120, 220, 320, 420, 520) at the impact zone (Z2);
guiding a second portion of the exhaust to bypass the entrance (122, 222, 322, 422, 522) to the first flow path (P1) and to instead enter a second flow (P2) path upstream of the entrance (122, 222, 322, 422, 522) to the first flow path (P1), the second flow path (P2) surrounding the conduit (120, 220, 320, 420, 520) or at least at the impact zone (Z2) of the conduit (120, 220, 320, 420, 520); and
merging the first and second portions of the exhaust downstream of the impact zone (Z2).
42. The method of clause 41, wherein merging the first and second portions of the exhaust includes guiding the second portion of the exhaust from the second flow path (P2) inwardly through a plurality of apertures defined by the conduit.
43. The method of clause 42, wherein the apertures are elongate along slot axes; and wherein the apertures are oriented so that the slot axes are transverse to flow axes of the first portion of the exhaust along an interior surface of the conduit.
44. The method of clause 43, wherein the merged first and second portions of the exhaust are swirling at the apertures so that the flow axes are angled relative to the conduit axis of the conduit arrangement.
45. The method of clause 43, wherein the apertures are spaced to overlap along reference axes that are transverse to the slot axes so that each flow axis intersects at least one of the apertures.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

The invention claimed is:
1. A conduit arrangement for use in an exhaust aftertreatment assembly, the conduit arrangement extending along a conduit axis and comprising:
a first flow path extending along the conduit axis of the conduit arrangement, the first flow path having a first entrance;
a second flow path at least partially surrounding the first flow path, the second flow path having a second entrance that is located downstream from the first entrance, the second flow path having a cross-sectional area that is smaller than a cross-sectional area of the first flow path;
a common flow path being fed from both the first flow path and the second flow path;
a mixing zone at which turbulence is applied to exhaust flowing through the first flow path such that the turbulence within the first flow path is greater than any turbulence within the second flow path;
an impact zone downstream of the mixing zone and upstream of the common flow path, the impact zone defined within the first flow path;
a merge zone at which the first and second flow paths combine to form the common flow path, the merge zone being downstream of the impact zone,
a doser mounting location configured to receive a reactant injector, the doser mounting location being oriented to face into the first flow path at or upstream of the mixing zone; and
a first conduit defining the mixing zone, the first conduit including tangential velocity imparting members disposed at the mixing zone, the first conduit defining a constant internal cross-dimension along the mixing zone.
2. The conduit arrangement of claim 1, further comprising a spray protection zone at the doser mounting location that inhibits swirling exhaust flow at the doser mounting location.
3. The conduit arrangement of claim 2, wherein the spray protection zone is defined by a ring of louvers upstream of the mixing zone.
4. The conduit arrangement of claim 2, wherein the spray protection zone is defined by a perforated conduit.

5. The conduit arrangement of claim 4, wherein the perforated conduit is fully disposed upstream of the mixing zone.

6. The conduit arrangement of claim 4, wherein the perforated conduit overlaps the mixing zone.

7. The conduit arrangement of claim 1, further comprising the first conduit extending between first and second axial ends and defining a through-passage, the through-passage forming the first flow path, the first conduit further defining the impact zone.

8. The conduit arrangement of claim 7, wherein the doser mounting location is disposed at the first axial end of the first conduit and is oriented to face along the conduit axis of the conduit arrangement.

9. The conduit arrangement of claim 7, wherein the tangential velocity imparting members include louvered apertures.

10. The conduit arrangement of claim 7, further comprising a second conduit disposed at least partially around the first conduit to define the second flow path therebetween, the second conduit extending between respective first and second axial ends, the first axial end of the second conduit being offset downstream from the first axial end of the first conduit.

11. The conduit arrangement of claim 10, wherein the first axial end of the second conduit is open to define the second entrance to the second flow path.

12. The conduit arrangement of claim 10, wherein the second conduit defines one or more apertures downstream of the first axial end of the second conduit, the one or more apertures of the second conduit defining the second entrance to the second flow path.

13. The conduit arrangement of claim 10, wherein the second axial end of the first conduit does not contact the second conduit at the merge zone.

14. The conduit arrangement of claim 10, wherein the first conduit defines one or more apertures that define an entrance to the common flow path at the merge zone.

15. The conduit arrangement of claim 14, wherein the common flow path is defined by the first conduit.

16. The conduit arrangement of claim 14, wherein the common flow path is defined by the second conduit.

17. The conduit arrangement of claim 14, wherein the common flow path is defined by a third conduit coupled to either of the first and second conduits.

18. The conduit arrangement of claim 14, wherein the one or more apertures of the first conduit are elongate along slot axes, and wherein the one or more apertures of the first conduit are oriented so that the slot axes are angled between 5 degrees and 85 degrees relative to the conduit axis of the conduit arrangement.

19. The conduit arrangement of claim 18, wherein the one or more apertures of the first conduit are oriented and spaced so that the one or more apertures of the first conduit overlap when viewed along a reference axis extending perpendicular to any of the slot axes.

20. A method of treating exhaust comprising:
directing exhaust along a conduit axis of a conduit arrangement;
guiding a first portion of the exhaust through an entrance of an inner conduit to a first flow path of the conduit arrangement;
inducing swirling of the first portion of the exhaust at a mixing zone of the first flow path, the inner conduit having a constant cross-dimension and tangential velocity imparting members at the mixing zone;
injecting reactant into the first portion of the exhaust traveling along a conduit that defines at least an impact zone of the first flow path, the impact zone being downstream from the mixing zone, the reactant being injected along a spray path that intersects the conduit at the impact zone;
guiding a second portion of the exhaust to bypass the entrance to the first flow path and to instead enter a second flow path upstream of the entrance to the first flow path, the second flow path surrounding the conduit or at least at the impact zone of the conduit; and
merging the first and second portions of the exhaust downstream of the impact zone.

* * * * *